(12) United States Patent  
Degenstein et al.

(10) Patent No.: US 8,216,344 B2
(45) Date of Patent: Jul. 10, 2012

(54) PURIFYING CARBON DIOXIDE USING ACTIVATED CARBON

(75) Inventors: Nick Joseph Degenstein, East Amherst, NY (US); Minish Mahendra Shah, East Amherst, NY (US); Bernard Thomas Neu, Lancaster, NY (US)

(73) Assignee: Praxair Technology, Inc., Danbury, CT (US)

( * ) Notice: Subject to any disclaimer, the term of this patent is extended or adjusted under 35 U.S.C. 154(b) by 441 days.

(21) Appl. No.: 12/564,100

(22) Filed: Sep. 22, 2009

(65) Prior Publication Data

US 2010/0083697 A1    Apr. 8, 2010

Related U.S. Application Data

(60) Provisional application No. 61/100,415, filed on Sep. 26, 2008.

(51) Int. Cl.
*B01D 53/02* (2006.01)

(52) U.S. Cl. ......... 95/129; 95/137; 95/148; 96/121; 96/134; 62/636; 422/168; 422/169; 422/170

(58) Field of Classification Search .......... 95/129, 95/137, 148; 96/121, 134; 62/636; 422/168–170
See application file for complete search history.

(56) References Cited

U.S. PATENT DOCUMENTS

| | | | |
|---|---|---|---|
| 3,294,487 A | 12/1966 | Pauling | |
| 3,486,852 A | 12/1969 | Tamura et al. | |
| 4,388,281 A * | 6/1983 | Holter et al. | 423/210 |
| 5,254,521 A * | 10/1993 | Knudson | 502/432 |
| 5,547,648 A * | 8/1996 | Buchanan et al. | 423/210 |
| 5,648,053 A * | 7/1997 | Mimura et al. | 423/210 |
| 5,679,238 A * | 10/1997 | Kim et al. | 205/554 |
| 6,521,200 B1 | 2/2003 | Silveston et al. | |
| 6,579,507 B2 * | 6/2003 | Pahlman et al. | 423/210 |
| 6,616,905 B1 | 9/2003 | Sonehara et al. | |
| 6,814,948 B1 | 11/2004 | Yasutake et al. | |
| 7,029,639 B2 | 4/2006 | Yasutake et al. | |
| 7,396,514 B2 * | 7/2008 | Hammel | 422/168 |
| 8,012,446 B1 * | 9/2011 | Wright et al. | 423/437.1 |
| 2002/0168302 A1 * | 11/2002 | Pahlman et al. | 422/171 |
| 2005/0214187 A1 * | 9/2005 | Johnson | 423/235 |
| 2007/0154374 A1 * | 7/2007 | Johnson et al. | 423/210 |
| 2007/0231244 A1 | 10/2007 | Shah et al. | |
| 2008/0250715 A1 * | 10/2008 | Cooper et al. | 48/197 FM |
| 2009/0101868 A1 * | 4/2009 | Zhang et al. | 252/184 |

FOREIGN PATENT DOCUMENTS

DE        3616501 A1    11/1987

(Continued)

OTHER PUBLICATIONS

Metzinger J, et al., "Application of a Periodically Operated Trickle Bed to Sulfur Removal from Stack Gas," *Chemical Engineering Science*, (47) 3723-3727, 1992.

(Continued)

*Primary Examiner* — Robert J Hill, Jr.
*Assistant Examiner* — Christopher P Jones
(74) *Attorney, Agent, or Firm* — Donald T. Black; Iurie A. Schwartz

(57) ABSTRACT

Carbon dioxide-containing feed stream such as flue gas is treated to produce a high-purity carbon dioxide stream by a series of steps including removing SOx and NOx with activated carbon, carrying out subambient-temperature processing to produce a product stream and a vent stream, and treating the vent stream by pressure swing adsorption or by physical or chemical absorption to produce a product stream which is recycled to the feed stream.

6 Claims, 26 Drawing Sheets

FOREIGN PATENT DOCUMENTS

EP    1790614 A1    5/2007

OTHER PUBLICATIONS

Metzinger J, et al., "A Novel Periodic Reactor for Scrubbing SO2 from Industrial Stack Gas," *Chemical Engineering Science*, (49) 4533-4546, 1994.

Vladea R, et al., "High-Efficiency Structured-Packing Catalysts with Activated Carbon for SO2 Oxidation from Flue Gas," *Energy & Fuels*, (11) 277-283, 1997.

Wilkinson et al., "Oxyfuel Conversion of Heaters and Boilers for CO2 Capture", Second National Conference on Carbon Sequestration (2003) pp. 1-13.

* cited by examiner

Valve Sequence
CO₂ VPSA – 6 Beds, 3 Pressure Equalizations and Flow through the Evacuating bed

| Step # | Time From-To | Duration | BED A1 | BED A2 | BED A3 | BED A4 | BED A5 | BED A6 |
|---|---|---|---|---|---|---|---|---|
| 1 | 0–30 | 30 | Feed | PE1 | PE3 | Evac | DP3 | DP1 |
| 2 | 30–60 | 30 | Feed | PE1 | PE3 | Evac | DP3 | DP1 |
| 3 | 60–90 | 30 | Feed | FeRP | PE2 | Evac | DPf | DP2 |
| 4 | 90–120 | 30 | Feed | FeRP | PE2 | Evac | DPf | DP2 |
| 5 | 120–150 | 30 | DP1 | Feed | PE1 | PE3 | Evac | DP3 |
| 6 | 150–180 | 30 | DP1 | Feed | PE1 | PE3 | Evac | DP3 |
| 7 | 180–210 | 30 | DP2 | Feed | FeRP | PE2 | Evac | DPf |
| 8 | 210–240 | 30 | DP2 | Feed | FeRP | PE2 | Evac | DPf |
| 9 | 240–270 | 30 | DP3 | DP1 | Feed | PE1 | PE3 | Evac |
| 10 | 270–300 | 30 | DP3 | DP1 | Feed | PE1 | PE3 | Evac |
| 11 | 300–330 | 30 | DPf | DP2 | Feed | FeRP | PE2 | Evac |
| 12 | 330–360 | 30 | DPf | DP2 | Feed | FeRP | PE2 | Evac |
| 13 | 360–390 | 30 | Evac | DP3 | DP1 | Feed | PE1 | PE3 |
| 14 | 390–420 | 30 | Evac | DP3 | DP1 | Feed | PE1 | PE3 |
| 15 | 420–450 | 30 | Evac | DPf | DP2 | Feed | FeRP | PE2 |
| 16 | 450–480 | 30 | Evac | DPf | DP2 | Feed | FeRP | PE2 |
| 17 | 480–510 | 30 | PE3 | Evac | DP3 | DP1 | Feed | PE1 |
| 18 | 510–540 | 30 | PE3 | Evac | DP3 | DP1 | Feed | PE1 |
| 19 | 540–570 | 30 | PE2 | Evac | DPf | DP2 | Feed | FeRP |
| 20 | 570–600 | 30 | PE2 | Evac | DPf | DP2 | Feed | FeRP |
| 21 | 600–630 | 30 | PE1 | PE3 | Evac | DP3 | DP1 | Feed |
| 22 | 630–660 | 30 | PE1 | PE3 | Evac | DP3 | DP1 | Feed |
| 23 | 660–690 | 30 | FeRP | PE2 | Evac | DPf | DP2 | Feed |
| 24 | 690–720 | 30 | FeRP | PE2 | Evac | DPf | DP2 | Feed |

Valve groups (columns): FEED In (101–106); Feed Out/FeRP (401–406); Evacuation (301–306); CoC DP/PE 1&2 (501–506); DPf and PE3 (601–606).

Legend: "Blank" = Valve Closed; O = Valve fully open; Φ = Valve with Positioner

FIG. 15

CO₂ VPSA – 5 Beds, 2 Pressure Equalizations and Flow through the Evacuating bed

| | | | | | | | | |
|---|---|---|---|---|---|---|---|---|
| 1 | Feed | DP1 | DP2 | DPf | Evacuation ← | PE2 | PE1 | FeRP |
| 2 | PE1 | FeRP | Feed | DP1 → | DPf | Evacuation ← | DP2 | PE2 |
| 3 | ation ← | PE2 | PE1 | FeRP | Feed | DP1 | DP2 | Evacu |
| 4 | DPf | Evacuation ← | DP2 | PE2 | FeRP | PE1 | DP1 | DP2 |
| 5 | DP1 | DP2 | DPf | Evacuation ← | PE2 | PE1 | FeRP | Feed |

| | | Typical Step Time |
|---|---|---|
| Feed | Feed to CO₂ VPSA → CO₂ depleted stream | 2 min |
| DP1 | CoC DP1 to PE1 with an A bed | 1 min |
| DP2 | CoC DP2 to PE2 with another of the A bed | 1 min |
| DPf | Final Depressurisation to provide purge to another bed on evacuation or produce part of the product to be mixed with the evacuated product | 1 min |
| Evac | CcC Evac to collect CO₂ product | 2 min |
| PE2 | CCC PE2 with an A bed on DP2 to increase CO₂ recovery | 1 min |
| PE1 | CCC PE1 with an A bed on DP1 to increase CO₂ recovery | 1 min |
| FeRP | CcC RP by Feed Effluent | 1 min |

FIG. 16

CO₂ VPSA – 6 Beds, 3 Pressure Equalizations and Direct Mixing

| | | | | | | | | | | | |
|---|---|---|---|---|---|---|---|---|---|---|---|
| 1 | Feed | | DP1 | DP2 | DP3 | DPf | Evacuation | | PE3 | PE2 | PE1 | FeRP |
| 2 | FeRP | Feed | | DP1 | DP2 | DP3 | DPf | Evacuation | | PE3 | PE2 |
| 3 | PE3 | PE2 | PE1 | FeRP | Feed | | DP1 | DP2 | DP3 | DPf | Evacuation |
| 4 | Evacuation | | PE3 | PE2 | PE1 | FeRP | Feed | | DP1 | DP2 | DP3 |
| 5 | DP3 | DPf | Evacuation | | PE3 | PE2 | PE1 | FeRP | Feed | | DP1 |
| 6 | DP1 | DP2 | DP3 | DPf | Evacuation | | PE3 | PE2 | PE1 | FeRP | Feed |

| Step | Description |
|---|---|
| Feed | Feed to CO₂ VPSA → CO₂ depleted stream |
| DP1 | CoC DP1 to PE1 with a bed |
| DP2 | CoC DP2 to PE2 with another bed |
| DP3 | CoC DP3 to PE3 with another bed |
| DPf | Final CcC DP to provide part of the CO₂ product to be mixed with the evacuated gas |
| Evac | CcC Evac to collect CO₂ product |
| PE3 | CCC PE3 with a bed on DP3 to increase CO₂ recovery |
| PE2 | CCC PE2 with a bed on DP2 to increase CO₂ recovery |
| PE1 | CCC PE1 with a bed on DP1 to increase CO₂ recovery |
| FeRP | CcC RP by Feed Effluent |

| | Typical Pressure, psia | |
|---|---|---|
| | Start | End |
| Feed | 375 | 375 |
| DP1 | 375 | 282 |
| DP2 | 282 | 190 |
| DP3 | 190 | 96.75 |
| DPf | 97 | 15 |
| Evac | 15 | 4 |
| PE3 | 4 | 97 |
| PE2 | 97 | 190 |
| PE1 | 190 | 282 |
| FeRP | 282 | 375 |

$CO_2$ VPSA – 5 Beds, 2 Pressure Equalizations and Direct Mixing

| | | | | | | | | | | |
|---|---|---|---|---|---|---|---|---|---|---|
| 1 | Feed | | DP1 | DP2 | DPf | Evacuation | | PE2 | PE1 | FeRP |
| 2 | PE1 | FeRP | Feed | | | DP1 | DPf | Evacuation | | DP2 | PE2 |
| 3 | ation | PE2 | PE1 | FeRP | Feed | | | DP2 | DPf | Evacu |
| 4 | DPf | DP1 | DP2 | PE2 | Evacuation | | PE1 | Feed | | FeRP | DP2 |
| 5 | DP1 | Evacuation | | DPf | PE1 | FeRP | Feed | | | DP2 | PE2 |

| | | Typical Pressure, psia | |
|---|---|---|---|
| | | Start | End |
| Feed | Feed to $CO_2$ VPSA → $CO_2$ depleted stream | 375 | 375 |
| DP1 | CoC DP1 to PE1 with a bed | 375 | 251 |
| DP2 | CoC DP2 to PE2 with another bed | 251 | 128 |
| DPf | Final CcC DP to provide part of the $CO_2$ product to be mixed with the evacuated gas | 128 | 15 |
| Evac | CcC Evac to collect $CO_2$ product | 15 | 4 |
| PE2 | CCC PE2 with a bed on DP2 to increase $CO_2$ recovery | 4 | 128 |
| PE1 | CCC PE1 with a bed on DP1 to increase $CO_2$ recovery | 128 | 251 |
| FeRP | CcC RP by Feed Effluent | 251 | 375 |

CO₂ VPSA – 8 Beds, 2 Pressure Equalizations and Direct Mixing
– 2 Beds on Feed, 3 Beds on Evacuation

| | | | | | | | | | | | | | | | |
|---|---|---|---|---|---|---|---|---|---|---|---|---|---|---|---|
| A1 | FEED | | DP1 | DP2 | DPf | Evacuation | | | PE2 | PE1 | RP | | | | |
| A2 | PE1 | RP | FEED | | | DP1 | DP2 | DPf | Evacuation | | | PE2 | | | |
| A3 | Evc | | PE2 | PE1 | RP | FEED | | | DP1 | DP2 | DPf | Evacuation | | | |
| A4 | Evacuation | | | PE2 | PE1 | RP | FEED | | | DP1 | DP2 | DPf | Evac | | |
| A5 | DPf | Evacuation | | | | PE2 | PE1 | RP | FEED | | | DP1 | DP2 | | |
| A6 | DP1 | DP2 | DPf | Evacuation | | | | PE2 | PE1 | RP | FEED | | | | |
| A7 | FEED | | DP1 | DP2 | DPf | Evacuation | | | | PE2 | PE1 | RP | | | |
| A8 | FEED | | | DP1 | DP2 | DPf | Evacuation | | | | PE2 | PE1 | RP | FEED | |

| Feed | Feed to CO₂ VPSA → CO₂ depleted stream |
|---|---|
| DP1 | CoC DP1 to PE1 with a bed |
| DP2 | CoC DP2 to PE2 with another bed |
| DPf | Final Depressurisation to provide part of the product to be mixed with the evacuated product |
| Evac | CcC Evac to collect CO₂ product |
| PE2 | CCC PE2 with a bed on DP2 to increase CO₂ recovery |
| PE1 | CCC PE1 with another bed on DP1 to increase CO₂ recovery |
| FRP | CoC Repressurization by Feed or CcC RP by Feed Effluent |

CO₂ VPSA – 11 Beds, 2 Pressure Equalizations and Direct Mixing
– 3 Beds on Feed, 2 Beds on Evacuation

| | FEED | FEED | FEED | DP1 | DP2 | DPf | Evacuation | Evacuation | PE2 | PE1 | RP |
|---|---|---|---|---|---|---|---|---|---|---|---|
| A1 | FEED | FEED | FEED | DP1 | DP2 | DPf | Evacuation | Evacuation | PE2 | PE1 | RP |
| A2 | RP | FEED | FEED | FEED | DP1 | DP2 | DPf | Evacuation | Evacuation | PE2 | PE1 |
| A3 | PE1 | RP | FEED | FEED | FEED | DP1 | DP2 | DPf | Evacuation | Evacuation | PE2 |
| A4 | PE2 | PE1 | RP | FEED | FEED | FEED | DP1 | DP2 | DPf | Evacuation | Evacuation |
| A5 | Evacuation | PE2 | PE1 | RP | FEED | FEED | FEED | DP1 | DP2 | DPf | Evacuation |
| A6 | Evacuation | Evacuation | PE2 | PE1 | RP | FEED | FEED | FEED | DP1 | DP2 | DPf |
| A7 | DPf | Evacuation | Evacuation | PE2 | PE1 | RP | FEED | FEED | FEED | DP1 | DP2 |
| A8 | DP2 | DPf | Evacuation | Evacuation | PE2 | PE1 | RP | FEED | FEED | FEED | DP1 |
| A9 | DP1 | DP2 | DPf | Evacuation | Evacuation | PE2 | PE1 | RP | FEED | FEED | FEED |
| A10 | FEED | DP1 | DP2 | DPf | Evacuation | Evacuation | PE2 | PE1 | RP | FEED | FEED |
| A11 | FEED | FEED | DP1 | DP2 | DPf | Evacuation | Evacuation | PE2 | PE1 | RP | FEED |

| | |
|---|---|
| Feed | Feed to CO₂ VPSA → CO₂ depleted stream |
| DP1 | CoC DP1 to PE1 with a bed |
| DP2 | CoC DP2 to PE2 with another bed |
| DPf | Final Depressurisation to provide part of the product to be mixed with the evacuated product |
| Evac | CcC Evac to collect CO₂ product |
| PE2 | CCC PE2 with a bed on DP2 to increase CO₂ recovery |
| PE1 | CCC PE1 with another bed on DP1 to increase CO₂ recovery |
| FRP | CoC Repressurization by Feed or CcC RP by Feed Effluent |

FIG. 23

PURIFYING CARBON DIOXIDE USING ACTIVATED CARBON

CROSS-REFERENCE TO RELATED APPLICATIONS

This application claims priority from U.S. provisional application Ser. No. 61/100,415, filed Sep. 26, 2008.

FIELD OF THE INVENTION

The present invention relates to the treatment of flue gas containing carbon dioxide, to remove impurities from the flue gas and to produce valuable byproducts.

BACKGROUND OF THE INVENTION

Combustion processes, such as coal-fired boilers, produce flue gases that contain carbon dioxide which it may be desirable to capture and sequester, for instance in saline aquifers or in oil or gas wells where the carbon dioxide is used for enhancing the production of oil or gas from the well. However, flue gas often contains impurities such as SOx, NOx and Hg which must be removed down to very low levels before the carbon dioxide can be used for enhanced oil recovery or sequestered. The present invention is a process for achieving such removal to produce relatively pure carbon dioxide.

BRIEF SUMMARY OF THE INVENTION

One aspect of the present invention is a process for treating gaseous carbon dioxide, comprising (A) providing a gaseous feed stream of carbon dioxide such as flue gas that also comprises NOx and sulfur dioxide, and that is at a pressure of at least 1.5 bar;

(B) adsorbing $SO_2$ and NOx from said feed stream onto a regenerated first bed of activated carbon under oxidizing conditions to convert said adsorbed sulfur dioxide to sulfur trioxide and to convert said adsorbed NO to nitrogen dioxide, thereby forming SOx-depleted NOx-depleted carbon dioxide and a loaded first bed comprising SOx-loaded NOx-loaded activated carbon;

(C) washing said loaded first bed with water to desorb sulfur trioxide and nitrogen dioxide therefrom into said water to form an aqueous solution containing sulfuric acid and nitric acid and a washed first bed of activated carbon, while adsorbing $SO_2$ and NOx from said feed stream on to a regenerated second bed of activated carbon under oxidizing conditions to convert said adsorbed sulfur dioxide to sulfur trioxide and to convert said adsorbed NO to nitrogen dioxide, thereby forming SOx-depleted NOx-depleted carbon dioxide and a loaded second bed comprising SOx-loaded NOx-loaded activated carbon;

(D) washing said loaded second bed with water to desorb sulfur trioxide and nitrogen dioxide therefrom into said water to form a mixture of sulfuric acid and nitric acid, while adsorbing SOx and NOx from said feed stream onto said washed first bed of activated carbon in step (B);

(E) subjecting the $SO_2$-depleted NOx-depleted carbon dioxide to a subambient-temperature recovery process, employing refrigeration provided by expansion of at least one liquid carbon dioxide product stream formed by said recovery process, and preferably employing only refrigeration provided by such expansion, to produce at least one gaseous carbon dioxide product stream and at least one gaseous carbon dioxide-containing vent stream;

(F) separating the vent stream into a carbon dioxide-rich stream and a carbon dioxide-depleted stream, by pressure swing adsorption or by physical or chemical absorption; and (G) recycling said carbon dioxide-rich stream to said feed stream.

The present invention also comprises apparatus useful for treating gaseous carbon dioxide that contains SOx and NOx, comprising (A) an activated carbon reactor system adapted to receive a gaseous feed stream of carbon dioxide such as flue gas that also comprises NOx and sulfur dioxide and that is at a pressure of at least 1.5 bar, and the activated carbon reactor system comprising at least one bed of activated carbon for adsorbing $SO_2$ and NO from said feed stream and converting adsorbed sulfur dioxide to sulfur trioxide and converting adsorbed NO to nitrogen dioxide, and thereby forming $SO_2$-depleted NOx-depleted carbon dioxide, wherein sulfur trioxide and nitrogen dioxide adsorbed on said bed can be washed therefrom with water;

(B) a subambient-temperature recovery system coupled to said activated carbon reactor system to receive therefrom $SO_2$-depleted NOx-depleted carbon dioxide and to treat said $SO_2$-depleted NOx-depleted carbon dioxide, employing refrigeration provided by expansion of at least one liquid carbon dioxide product stream formed in said recovery system, to produce at least one gaseous carbon dioxide product stream and at least one gaseous carbon dioxide-containing vent stream;

(C) a carbon dioxide separation system coupled to said subambient-temperature recovery system to receive therefrom a gaseous carbon dioxide-containing vent stream and to separate said vent stream into a carbon dioxide-rich stream and a carbon dioxide-depleted stream by pressure swing adsorption or by physical or chemical absorption; and wherein said carbon dioxide separation system is coupled to said feed stream to recycle said carbon dioxide-rich stream to feed stream.

Another aspect of the invention comprises reacting the mixtures of sulfuric acid and nitric acid formed in steps (C) and (D) with calcium carbonate to form calcium salts of said acids, and evolved carbon dioxide, and recycling evolved carbon dioxide to said feed flue gas.

In another aspect of the invention, said regenerated first and second beds are contacted with said carbon dioxide-depleted stream to remove water from said regenerated beds prior to adsorption of $SO_2$ and NOx thereon from a feed stream of carbon dioxide.

In yet another aspect of the invention, said feed stream is produced by oxy-fuel combustion with or without recycle of gaseous products of said combustion to the combustion.

A further preferred aspect of the invention further comprises separating air into an oxygen-rich nitrogen-lean stream and a nitrogen-rich oxygen-lean stream, feeding said oxygen-rich nitrogen-lean stream to said oxy-fuel combustion, and contacting said washed first and second beds with said nitrogen-rich oxygen-lean stream to remove water from said washed beds prior to adsorption of $SO_2$ and NOx thereon from a feed stream containing carbon dioxide.

As used herein, "SOx" means any gaseous oxide of sulfur, such as sulfur dioxide and sulfur trioxide, and mixtures thereof.

As used herein, "NOx" means a mixture of gaseous oxides of nitrogen that contains at least both NO and $NO_2$.

As used herein, "oxy-fuel combustion" means feeding fuel and feeding an oxidant stream having an oxygen content of at least 80 vol. % to a combustion process and combusting the fuel with oxygen, preferably with recycle to the combustion process of at least a portion of the gaseous products of the combustion. An oxyfuel combustion process generates a flue gas stream rich in carbon dioxide.

As used herein, "pressure swing adsorption" means adsorbing a product, in this case carbon dioxide, from a gaseous feed stream onto a solid adsorbent at a first pressure, removing the feed stream depleted of the adsorbed product, and then desorbing the product at a second pressure different from the first pressure.

As used herein, "vacuum pressure swing adsorption (VPSA)" means a pressure swing adsorption process in which the second pressure is subambient pressure.

As used herein, "physical absorption" means absorbing a product, in this case carbon dioxide, from a gaseous feed stream by passing the feed stream into a liquid which preferentially dissolves the carbon dioxide from the feed stream, removing the feed stream depleted of the absorbed product, and then recovering the carbon dioxide from the liquid such as by lowering the pressure over the liquid or by stripping the carbon dioxide out of the liquid, wherein the absorption of the carbon dioxide into the liquid does not involve a chemical reaction of the carbon dioxide.

As used herein, "chemical absorption" means absorbing a product, in this case carbon dioxide, from a gaseous feed stream by passing the feed stream into a liquid which contains a component with which the carbon dioxide preferentially reacts, removing the feed stream depleted of the absorbed product, and then recovering the carbon dioxide from the liquid such as by lowering the pressure over the liquid or by stripping the carbon dioxide out of the liquid, wherein the absorption of the carbon dioxide into the liquid involves a chemical reaction of the carbon dioxide with a component in the liquid.

BRIEF DESCRIPTION OF THE DRAWINGS

FIG. 15 shows the valve sequence for operation of the carbon dioxide VPSA unit shown in FIGS. 13 and 14.

FIG. 16 illustrates an alternative cycle step chart for a carbon dioxide VPSA unit having five beds, two pressure equalization steps and flow through the evacuating bed, useful in the present invention.

FIG. 18 illustrates a further alternative cycle step for a carbon dioxide VPSA unit having six beds, three pressure equalization steps and direct mixing, useful in the present invention.

FIG. 20 shows the valve sequence for operation of the carbon dioxide VPSA unit shown in FIGS. 18 and 19.

FIG. 21 illustrates yet another cycle step chart for a carbon dioxide VPSA unit having five beds, two pressure equalization steps and direct mixing, useful in the present invention.

FIG. 22 illustrates yet another cycle step chart for a carbon dioxide VPSA unit having eight beds, two pressure equalization steps and direct mixing in which two beds are continuously on feed and at least two beds are continuously under evacuation, useful in the present invention.

FIG. 23 illustrates a further cycle step chart for a carbon dioxide VPSA unit having eleven beds, two pressure equalization steps and direct mixing in which three beds are continuously on feed and two beds are continuously under evacuation, useful in the present invention.

DETAILED DESCRIPTION OF THE INVENTION

The invention is useful in treatment of gaseous carbon dioxide streams which may be obtained in many ways. In particular, gaseous carbon dioxide streams with which the invention is useful include those produced by combustion, especially flue gas streams produced by combustion of hydrocarbonaceous fuels such as coal. The various aspects of the present invention are described below with particular reference to such flue gas streams, but without intending to be limited to such streams.

Figure 1:
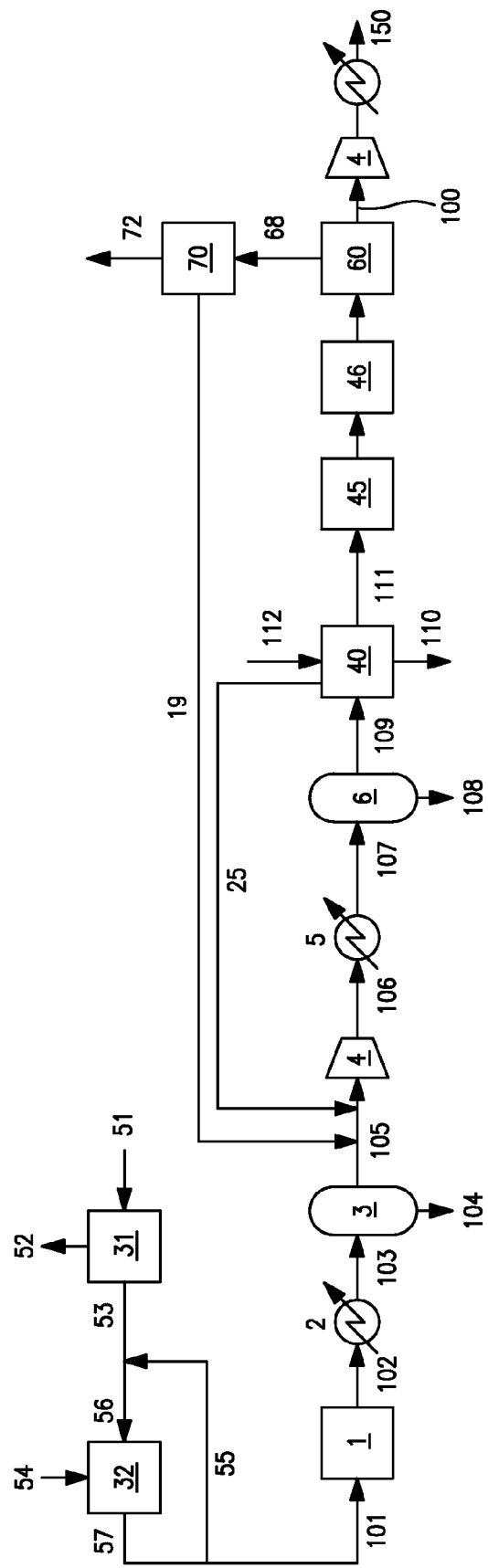
FIG. 1 is a block diagram of a process for treating flue gas, in which the present invention is useful.

FIG. 1 shows a schematic diagram of an overall flue gas treatment process which includes the aspects of the present invention. Carbon dioxide-rich flue gas is obtained from a combustion operation such as a coal-fired boiler, and preferably from an oxy-fuel combustion operation wherein coal or other fuel is combusted with gaseous oxidant having a nitrogen content lower than that of air, i.e. lower than 78% vol. %, preferably lower than 40% and more preferably lower than 15%. The oxidant stream could be oxygen with at least 80% by vol. purity produced from air separation unit or it could be produced by mixing said oxygen from air separation unit with recycled flue gas resulting in a mixture having an oxygen content anywhere between 20 vol. to 99.9%% oxygen.

The flue gas is preferably treated, such as in an electrostatic precipitator, bag house filter or in a cyclone, to remove entrained particulate matter therefrom. Then the flue gas is cooled and any condensed water is removed.

The flue gas is then compressed to a pressure of at least 1.5 bar, preferably at least 20 bar, and typically 20 to 50 bar. Contaminants (SOx, NOx, and Hg) and moisture are removed and a cleaned-up stream containing carbon dioxide and atmospheric gases ($O_2$, N2 and Are) is formed which is fed to a subambient-temperature processing stage which upgrades the purity of the carbon dioxide and produces a product stream having a desired high carbon dioxide level (95 to 99.9%). The vent stream from the subambient-temperature processing stage is fed to an adsorption or absorption stage such as a VPSA (vacuum pressure swing adsorption) unit to recover additional carbon dioxide. The recovered carbon dioxide from this stage, typically in a concentration on the order of 80 vol. %, is recycled and mixed with the feed stream of carbon-dioxide-rich flue gas. The adsorption or absorption stage also produces a waste stream which is used as described herein, or treated further or vented to the atmosphere.

Referring to FIG. 1, air stream 51 is separated in an air separation unit 31 into an oxygen-rich nitrogen-lean stream 53 and a nitrogen-rich oxygen-lean stream 52. The oxygen-rich nitrogen-lean stream 53 is fed to combustion unit 32 (e.g. a furnace or boiler), preferably after being combined with recycled flue gas stream 55 to form stream 56, along with fuel which is shown as stream 54. In combustion unit 32, heat released from combustion reaction can be used for many different purposes. In a power plant, combustion unit generates steam at different pressures for power generation. When combustion unit is a refinery process heater, the heat of combustion is used to heat process fluid. In a lime kiln of a cement plant, the heat of combustion is used to calcine limestone to generate calcium oxide. In a boiler used in oil sands operation, combustion unit generates steam which is then injected underground for oil recovery. It will be evident to anyone skilled in the art that the present invention can be applied to other processes involving oxy-combustion and/or flue gas recirculation.

Combustion in unit 32 produces flue gas 57 part of which may be recycled as stream 55 (as is preferably the case with combustion using oxidant having a high oxygen content) and part of which as stream 101 is fed to a particulate matter control device 1. The particulate matter control device 1 can also be located before the recycle stream 55 if necessary. The flue gas stream 102 following particulate removal is fed to cooling and water removal devices 2 and 3, respectively. Stream 103 represents cooled flue gas proceeding from device 2 to device 3, though the cooling and water removal can instead be carried out in one device. Condensed water 104 is removed from the flue gas.

The flue gas stream 105 from the cooling and water removal is fed to compressor 4, which could have multiple stages of compression, intercoolers and water knock-out drums. Preferably the flue gas 105 is compressed up to about 25 to 50 bar in a staged compression train, although the process of this invention can operate at any pressure from about 1.5 bar to a pressure needed for sequestration of carbon dioxide in product stream 150. Compressed stream 106 is cooled in heat exchanger 5 to a temperature of 10-200° C., preferably to 20-50° C.

Typical characteristics of the compressed flue gas stream 107 are shown in the following table:

| Characteristic | | Preferred range |
|---|---|---|
| Temperature, C. | 10-100 | 20-50 |
| Pressure, bar | 1.5-60 | 20-40 |
| $CO_2$ (vol. %) | 50-95 | 50-95 |
| NOx (ppm) | 20-1000 | |
| SOx (ppm) | 50-2000 | 200-1000 |

Referring again to FIG. 1, the compressed flue gas 107 is fed to a phase separator 6 to separate any condensed water.

Compressed flue gas stream 109 from phase separator 6 is fed to activated carbon reactor system 40 where NOx and $SO_2$ are removed from the flue gas, and stream 110 comprising an aqueous solution of sulfuric acid and nitric acid is formed and about one third of NO absorbed is released, as described below. Any released NO from this system when nitric acid is formed is recycled as stream 25 and combined with stream 105. The activated carbon reactor system 40 also produces NOx-depleted $SO_2$-depleted flue gas stream 111. Stream 111 is dried in a dryer unit 45 and is passed through a mercury removal unit 46 and then fed to a cold box (subambient-temperature processing unit) 60 where gases including oxygen, nitrogen and argon, and also including NOx and CO if present, are removed from the flue gas. Cold box 60 produces stream 100 containing high-purity carbon dioxide, typically having a carbon dioxide content higher than 95 vol. %. Cold box 60 also produces a vent gas stream 68 comprising carbon dioxide as well as other gases removed from the flue gas inside cold box 60. Stream 68 is fed to a carbon dioxide separation system 70 where carbon dioxide is separated from the other gases by adsorption or chemical or physical absorption. Carbon dioxide separation system 70 produces waste gas stream 72 which can be used as described herein, or can be further treated or vented to atmosphere, and carbon dioxide-containing product stream 19 which is recycled and combined with stream 105 (or, alternatively, with stream 106 or stream 107).

Figure 2:
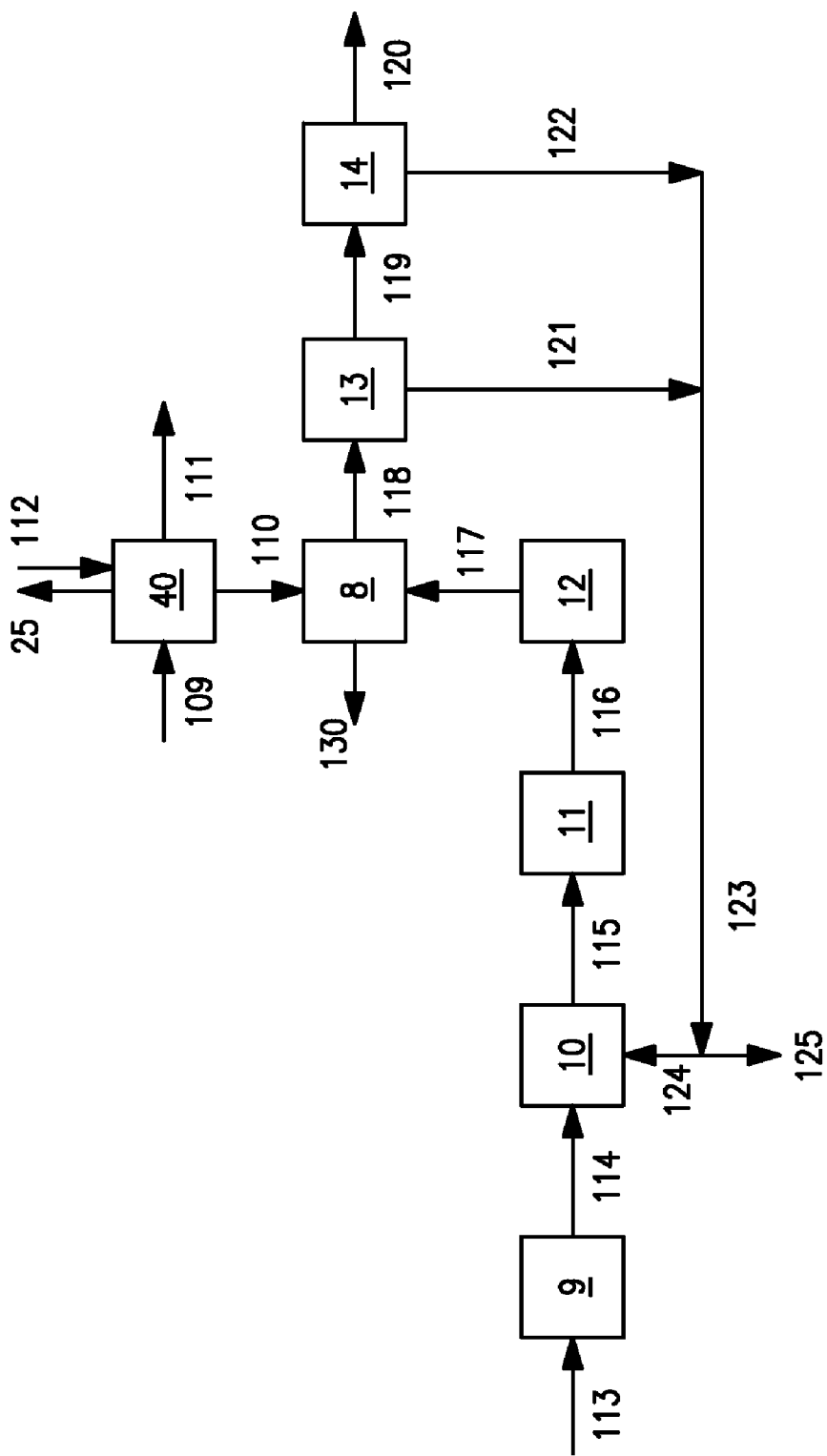
FIG. 2 is a block diagram of a preferred embodiment of a process according to the present invention.

Turning to FIG. 2, the compressed carbon dioxide-rich feed flue gas stream 109 is fed to an activated carbon system 40. The activated carbon reactor system 40 comprises at least one bed of activated carbon, and preferably comprises at least two activated beds with at least one bed removing SOx and NOx from the flue gas while the other(s) are regenerated by washing with water 112. The water washing could be periodic or continuous. The water 112 may be recycled water from the acid neutralizer 8, fresh water or some combination.

Useful activated carbon includes any that adsorbs NOx and SOx as the case may be under the conditions applied in this process. Preferred activated carbon includes that which is described in U.S. Pat. No. 6,114,273, the entire content of which is hereby incorporated herein by reference. A preferred activated carbon is that which is commercially sold under the name "Centaur" by Calgon Carbon Corporation.

The activated carbon adsorbs $SO_2$ and catalyzes the oxidation of the adsorbed $SO_2$ to $SO_3$. The $SO_3$ then remains adsorbed on the surface of the activated carbon, from which it is washed with water and thereby converted to sulfuric acid. The activated carbon can also adsorb NO and catalyze the oxidization of NO to $NO_2$. This typically occurs after $SO_2$ has been fully adsorbed by the activated carbon bed because the adsorption of $SO_2$ and $SO_3$ on the carbon sites is typically favored over the adsorption of NO and $NO_2$. Given a large enough bed of activated carbon, the activated carbon will also function to contain NOx. In oxy-fuel combustion there is a decreased amount of thermal NOx formed because the combustion chamber is largely free of N2. The amount of NOx removal afforded by the activated carbon bed may be enough to eliminate the need for further NOx treatment of the flue gas via other commercial techniques such as selective catalytic reduction.

The carbon dioxide-enriched flue gas is contacted with activated carbon in reactor system 40 at a pressure preferably greater than 1.5 bar to adsorb and convert $SO_2$ to $SO_3$ and NO to $NO_2$ on the surface of the activated carbon. The adsorbed $SO_3$ and $NO_2$ are then removed from the surface of the activated carbon with liquid water, to produce a solution of sulfuric acid and nitric acid. After washing, the activated carbon surface is again clean and available for adsorption. The following reactions occur:

$$SO_2(g) + C(s) => SO_2(abs)$$

$$SO_2(abs) + \frac{1}{2}O2(abs) => SO_3(abs)$$

$$SO_3(abs) + H_2O(l) => H2SO_4(aq) + C(s)$$

$$NO(g) + C(s) \rightarrow NO(abs)$$

$$NO(abs) + \frac{1}{2}O_2 \rightarrow NO_2(abs)$$

$$3NO_2(abs) + H_2O(l) \rightarrow 2HNO_3(aq) + NO(g)$$

The maximum NO removal efficiency of unit 40 will be approximately 66% as one third of NO gets released when nitric acid is formed. To improve NOx removal efficiency of the system, NO released during the washing step can be recycled to a suction of compressor 4. Oxidation of NO to $NO_2$ may also occur homogeneously in the gas phase at some point during the compression, intercooling and water knockout system, units 4 and 5 and 6. The formed $NO_2$ may be captured in the condensate 108 before the it travels to the reactor system 40. Because of this homogeneous chemistry effect, a single pass NOx removal efficiency could actually be higher than 66%.

Addition of oxidant is not normally required because excess oxygen of at least 1% is typically present in the feed flue gas. However, oxygen can be provided by feeding air, oxygen-enriched air, or commercially pure oxygen ($O_2$ content at least 90 vol. %) to the activated carbon beds.

In the case of multiple activated carbon beds, washing will be alternated between beds so that an overall high SOx and NOx removal efficiency can be continuously maintained. Having multiple beds also allows for service or replacement of the activated carbon in one or more beds while still processing of flue gas continues with other beds.

The water washing can be performed by continuously or periodically feeding the wash water onto the activated carbon bed that is loaded with $SO_3$ and $NO_2$. In either case single or multiple beds may be employed for the removal of SOx and NOx from the flue gas. The water wash may be administered to flow co-currently or counter currently with respect to the flue gas. Also the direction of flue gas flow and/or the direction of water flow may be changed or reversed to achieve better activated carbon usage.

The activated carbon bed is typically a fixed bed although it is also possible to perform the $SO_2$ and NOx adsorption and oxidation in a moving or fluidized bed of activated carbon.

Washing of the activated carbon beds with liquid water is typically performed periodically and serves to decrease the volume of water needed for washing while concentrating the produced sulfuric acid solution. When the activated carbon is being washed the surface of the activated carbon is largely unavailable for adsorption of SOx gases. To accommodate the periodic washing without loss of throughput, it is preferable to use multiple activated carbon beds in parallel for processing of the SOx containing flue gas.

Figure 3:
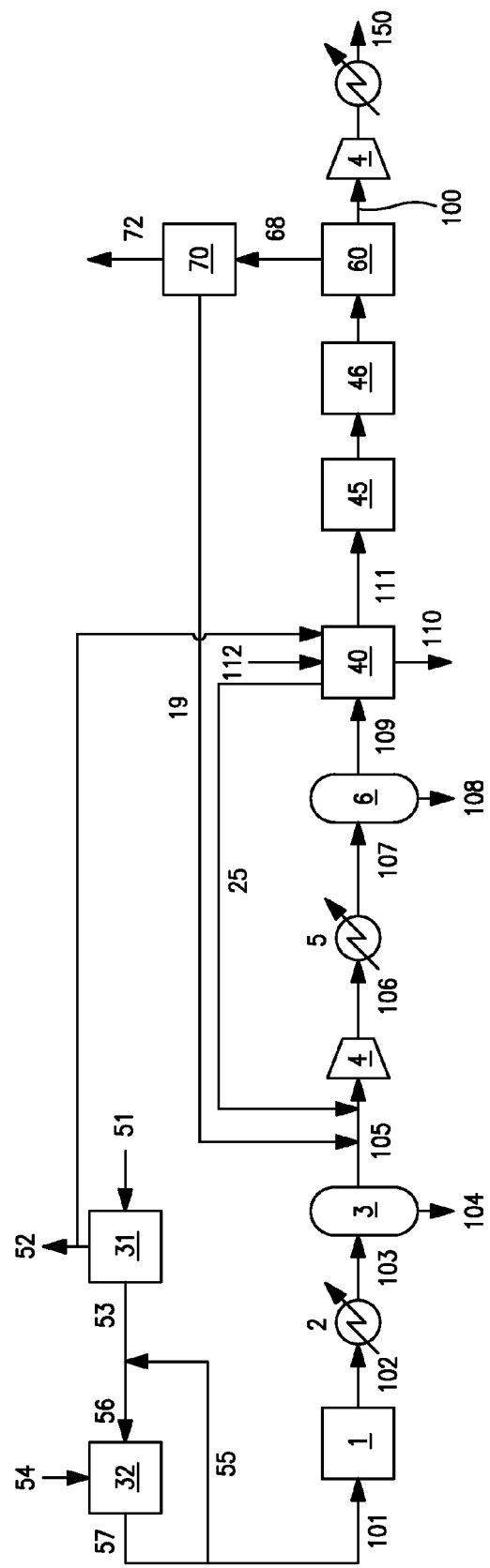
FIG. 3 is a block diagram of another embodiment of the embodiment shown in FIG. 2.

Preferably, washed beds of activated carbon are contacted with drying gas to remove water from the beds before additional feed flue gas is contacted with the washed beds. A portion of the nitrogen-rich stream 52 from the air separation unit 32 could be used for this purpose. This embodiment is shown in FIG. 3.

Figure 4:
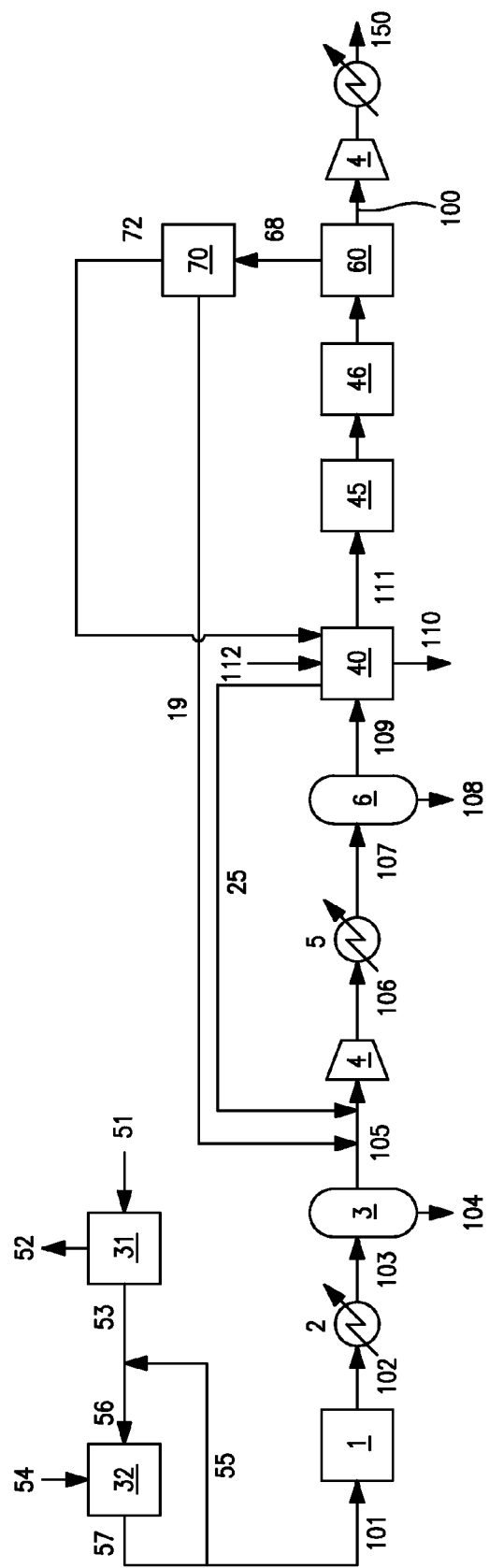
FIG. 4 is a block diagram of another embodiment of embodiment shown in FIG. 2.

Another stream which could be used for this purpose is the stream 72, containing mainly atmospheric gases and some carbon dioxide, which is produced in a carbon dioxide separation system 70. This embodiment is shown in FIG. 4. An advantage of using stream 72 is that stream 72 is available at high pressure, which means that the activated carbon bed will not need to be depressurized during the washing and drying steps. Furthermore, any NOx which is not absorbed in an activated carbon bed will be contained in stream 72. Drying of the activated carbon beds with this stream will give any NOx in this stream an opportunity to adsorb on the fresh activated carbon surface without competition from SOx.

Figure 5:
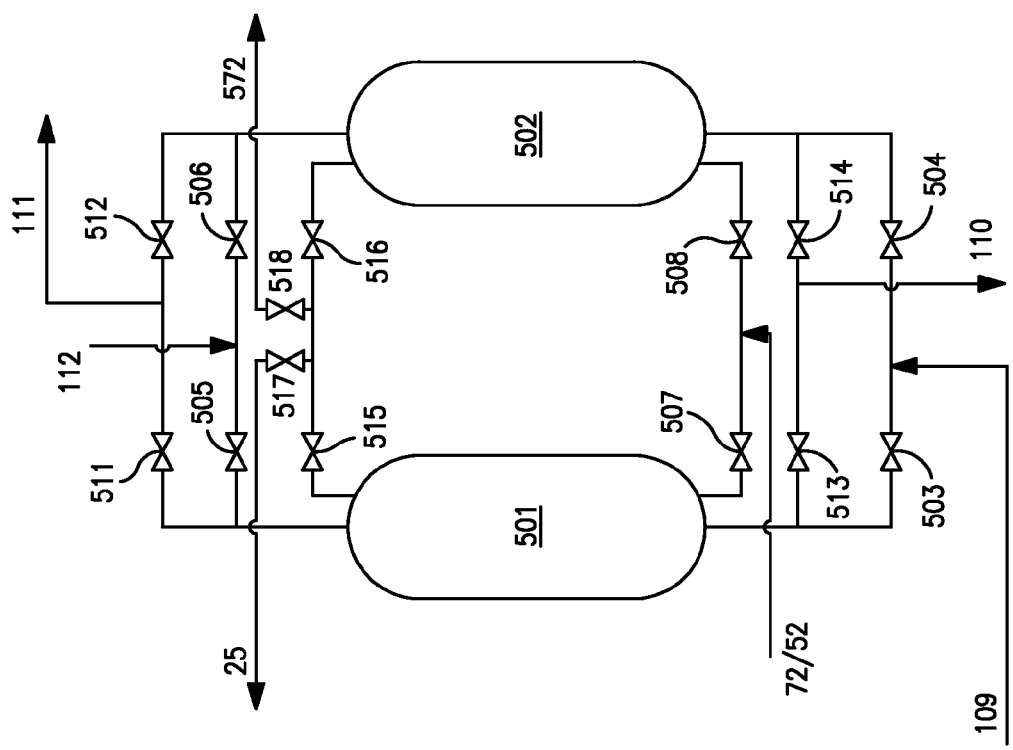
FIG. 5 is a diagram of an activated carbon bed reactor useful in the present invention.

FIG. 5 illustrates an embodiment of reactor system 40, comprising two activated carbon beds 501 and 503. To feed flue gas into bed 501 while washing adsorbed $SO_3$ and $NO_2$ from the activated carbon of bed 503, valves 503 and 506 are opened, as are valves 511, 514, 516 and 517. Valves 504 and 505 are closed, as are valves 512 and 513. Valves 507, 508, 515 and 518 are also closed. Flue gas flows through valve 503 into bed 501, and emerges from bed 501 through valve 511 and become streams 111. Water 112 flows through valve 506 into bed 502, and leaves bed 502 as a sulfuric acid-nitric acid solution which flows through valve 514 as stream 110. Any evolved NO during washing step leaves bed 502 as a gaseous NO, which leaves bed through valves 516 and 517 as stream 25.

Preferably, to remove adsorbed water from the activated carbon in bed 502 after water has washed $SO_3$ and $NO_2$ from bed 502 but before flue gas is fed into bed 502, valves 506, 514 and 517 are closed and valves 508, 516 and 518 are opened, and drying gas whether from stream 72, stream 52, or from another source, is flowed through bed 502 and out through valves 516 and 518 and line 572.

When bed 502 has been washed and dried sufficiently to be able to adsorb SOx and NOx from feed flue gas, valves 506 and 508 are closed, as are valves 514, 516 and 518. Valves 504 and 512 are opened to permit flue gas to flow through bed 502 and out into stream 111. Bed 501, having become loaded with SOx and NOx, is ready to be washed and (preferably) then dried. Accordingly, valves 503 and 511 are closed, and valves 505 and 513 are opened to enable wash water to flow through bed 501, and valves 515 and 517 are opened to enable evolved NO to be removed as stream 25. When sufficient washing of bed 501 has occurred, valves 505, 513 and 517 are closed, and valves 507 and 518 are opened to enable drying gas to flow through bed 501. This sequence of steps is repeated.

SOx-depleted NOx-depleted stream 111 is recovered from reactor system 40. It is substantially SOx and NOx free and may proceed to drying, particulate removal, further purification, compression and/or sequestration. Preferably, stream 111 is treated further in cold box 60 as described herein. The dilute stream 110 of sulfuric acid and nitric acid leaves the reactor system 40 and proceeds to neutralizer 8 where the acids are neutralized with limestone (which may also contain lime). Other agents may also be used for neutralization of the dilute acid streams including strong bases such as NaOH, weak bases, or other solid substances. The neutralizer 8 may operate at elevated pressure or at atmospheric pressure.

Referring to FIG. 2, limestone 113 is delivered to storage site 9 from where it is fed as stream 114 to slurrying stage 10 where it is crushed and combined with recycled water fed as stream 124. The limestone slurry is pumped by pump 11 to a slurry storage tank 12 from which the slurry is fed as stream 117 to neutralizer 8. The limestone reacts with the sulfuric and nitric acids, forming evolved gaseous carbon dioxide 130 as well as calcium sulfite and calcium sulfate (the hydrate of which is gypsum) which are removed from neutralizer 8 slurried in stream 118. This slurry is treated to remove water therefrom. In one embodiment the slurry is fed to thickener 13 from which water is removed and recovered in stream 121, and the thickened slurry is fed to vacuum filter 14 from which water is removed and recovered in stream 122. Optionally, streams 121 and 122 can be combined to form stream 123. The resulting substantially dry solid calcium sulfite and/or gypsum 120 may then be further dried, sold or disposed of.

Some of stream 123 is removed from the process as stream 125, to remove calcium nitrate (which is water soluble) from the system and would otherwise accumulate in the system. Calcium nitrate is the neutralized product of nitric acid that is formed because of the adsorption of NOx compounds in the activated carbon bed(s).

Figure 6:
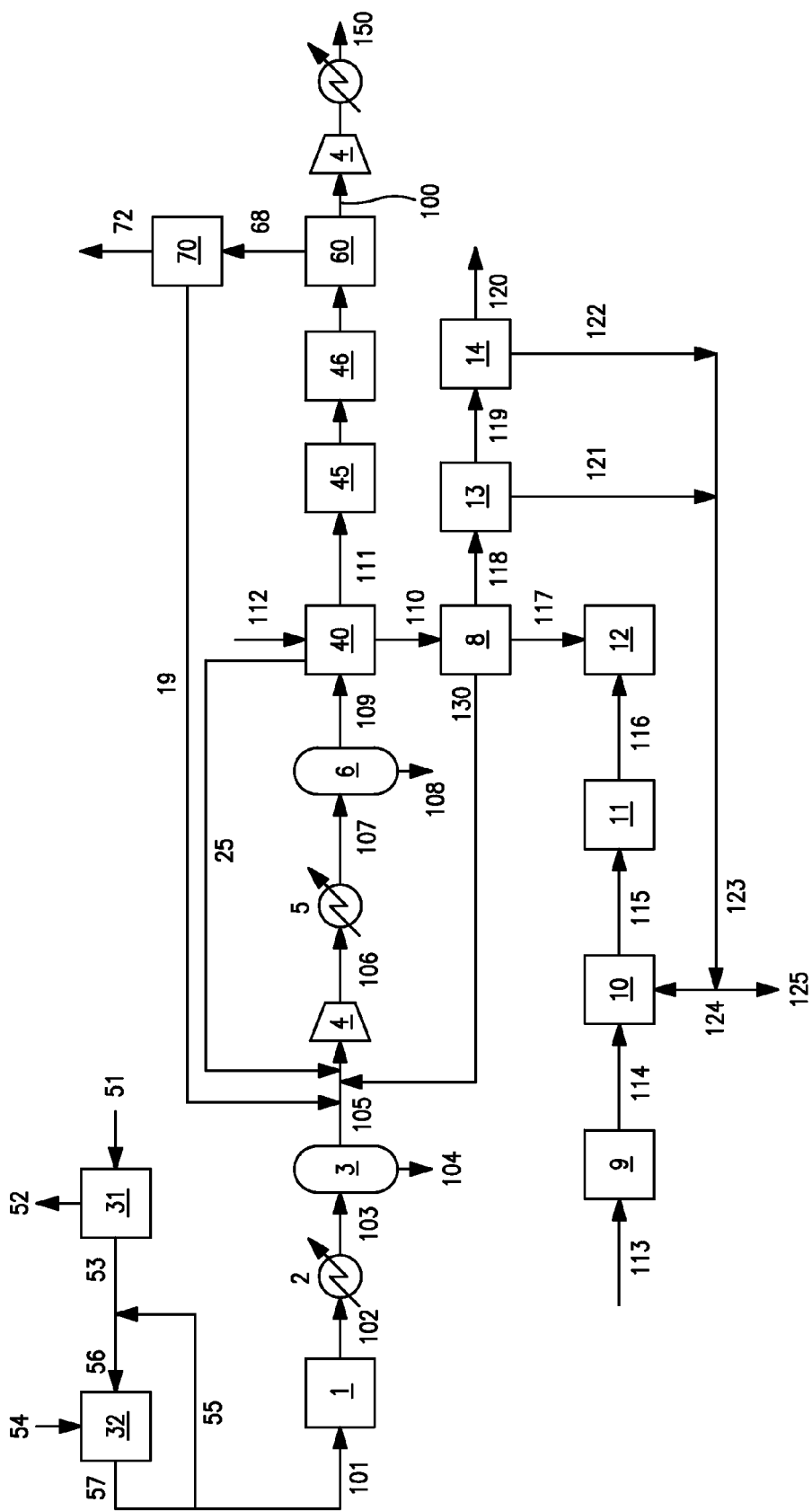
FIG. 6 is a block diagram of another embodiment of the embodiment shown in FIG. 2.

In a preferred embodiment, stream 130 containing carbon dioxide which is evolved from neutralization of sulfuric and nitric acids in the neutralization reactor 8 may be recycled into the flue gas stream 101 prior to compression. This embodiment is shown in FIG. 6.

Elevated pressure of greater than about 2 bar is advantageous in the activated carbon adsorption beds in reactor system 40 because high pressures will favor the adsorption of $SO_2$ onto the surface of the activated carbon and will also favor the adsorption of more $SO_2$ molecules per volume of activated carbon. Elevated pressure will also serve to decrease the necessary size of the reactors thus decreasing the capital and operating costs associated with this process.

Treatment of the flue gas at elevated pressure decreases the volume of reactor needed for sulfur removal. A decreased reactor size will require less material for container construction and less activated carbon for sulfur removal. Also an increased partial pressure of the contaminants SOx and NOx in the flue gas stream serves to increase the driving force for adsorption of the contaminants onto the activated carbon surface. This helps to increase the efficiency of sulfur removal for a given amount of activated carbon over the typical atmospheric pressure cases which are described in the prior art.

This elevated pressure activated carbon removal technique may be the sole method of SOx removal or may be supplemented with another SOx removal method for more efficient or more complete sulfur removal.

A potential complication with the first embodiment involves the amount of $SO_3$ and particulate emission coming directly from the furnace. $SO_3$ normally comprises a small portion of the total SOx from the furnace and is highly hydroscopic. When combined with water in any proportion $SO_3$ is adsorbed to form sulfuric acid H2SO4. When gases containing $SO_3$ and water are cooled to their dewpoint, the first drops to condense are composed of concentrated and corrosive sulfuric acid. This liquid can take the form of a fine sulfuric acid mist which is difficult to eliminate and highly corrosive.

Figure 25:
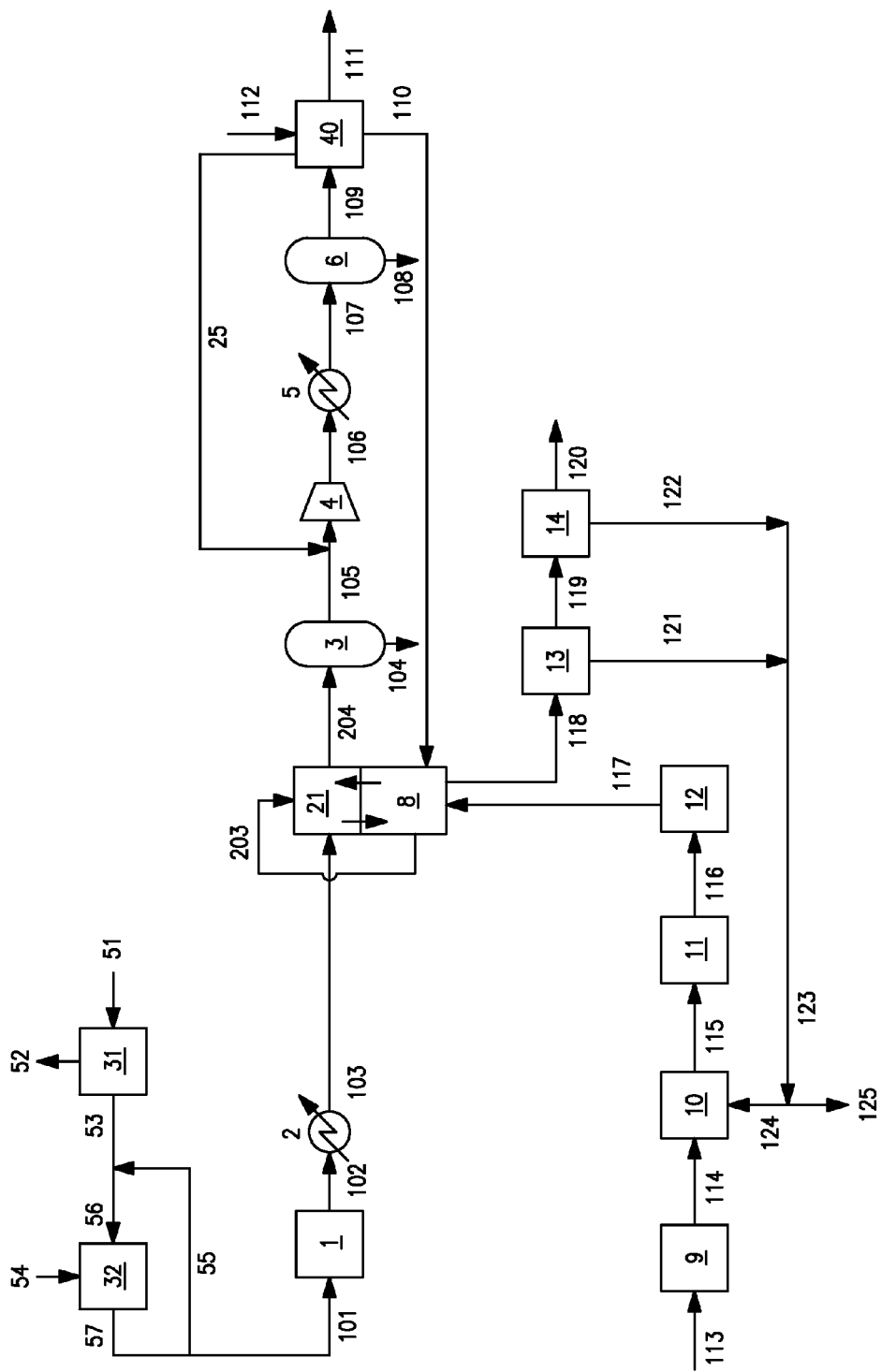
FIG. 25 is a diagram of another embodiment of the present invention.

The flue gas exiting combustion unit 32 should be kept above the dew point to reduce the possibility of corrosion of heat exchangers and the boiler housing. This is especially important for fuels containing high levels of sulfur. The invention can be practiced in combination with conventional atmospheric-pressure wet or dry flue gas desulfurization ("FGD") unit before compression of the feed flue gas to remove a portion of the SOx contained in the flue gas. The activated carbon desulfurization step, preferably operated at pressure will then remove additional SOx and or NOx. The atmospheric-pressure FGD system can operate like a traditional FGD and remove >90% of the SOx contained in the flue gas. In the case where a full size traditional FGD is used before compression, the activated carbon based SOx and/or NOx removal method may be used to increase the overall sulfur removal from above 90% removal to near 100% removal. When a traditional wet FGD system is used, the temperature of the flue gas is kept above its dewpoint through the exit of the boiler and through the particulate filtering device to reduce the possibility of corrosion. Sulfur compounds are then captured in the wet FGD absorber tower. This embodiment is shown in FIG. 25. In a conventional FGD system, contact tower 21 and neutralizer 8 are closely coupled. Flue gas 103 is contacted with the recirculating slurry 203 containing limestone. The reaction between limestone $SO_2$ in the flue gas produces calcium sulfite. The slurry containing calcium sulfite falls into neutralizer 8, where calcium sulfite is converted to calcium sulfate by forced oxidation. Dilute acid stream 110 from activated carbon system 40 is also added to the neutralizer 8. Oxygen necessary for forced oxidation can come from either ambient air, an air separation unit 31 or from a portion of stream 68 obtained from cold box 60. Any carbon dioxide that is evolved in the neutralizer 8 and contact tower 21 ends up in SOx-depleted stream emerging from contact tower 21 as stream 204.

Figure 26:
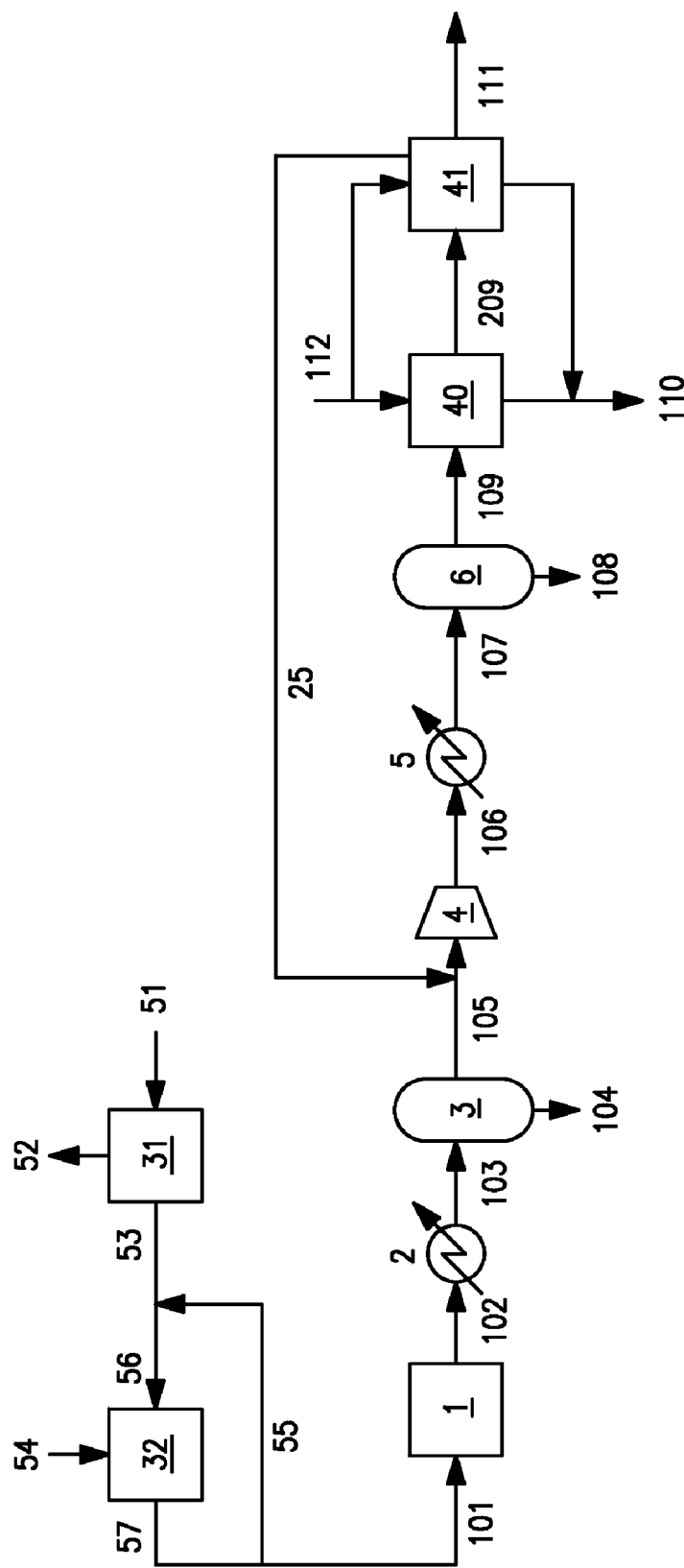
FIG. 26 is a diagram of another embodiment of the present invention.

In all the preceding embodiments only one activated carbon reactor system was used for removal of both SOx and NOx. It is also possible to use two separate adsorbent bed systems as shown in FIG. 26. Preferably, first activated carbon reactor system 40 will remove SOx and second adsorbent reactor system 41 will remove NOx from flue gas. Advantage of this configuration is ability to use two different materials optimized for SOx and NOx removal, respectively. If applicable, dilute acid streams from both the systems 40 and 41 can be combined in stream 110 and processed as described before.

If desulfurization by activated carbon system 40 is performed at elevated pressure the gas must be compressed. Compressing a warm gas above the dew point will result in significant extra energy costs. Cooling the gas to below the dewpoint prior to compression will probably require the compressor to be made of more expensive materials. In either case it is likely that corrosion resistant materials will need to be used in heat exchangers prior to the compressor(s) or in compression intercoolers or knock-out drums to deal with the possible corrosion.

Other methods of $SO_3$ removal may also be used to reduce the amount of $SO_3$ prior to heat exchange, compression or particulate removal such as a liquid contacting device, typically using a solution containing water as the wash liquid. Such a gas/liquid contacting device would be principally designed for efficient removal of $SO_3$ from flue gas. A combination of a heat exchanger and a knock-out drum with an effective mist elimination device, or a direct contact heat exchanger may also suffice for $SO_3$ removal prior to compression or further heat exchange.

Particulate matter may also be of concern in the activated carbon reactors. Accumulation of particulate matter may plug pores or increase the pressure drop in the activated carbon bed which may decrease the efficiency of SOx and/or NOx removal. It may be advantageous to periodically reverse the flow in the activated carbon beds to aid in the removal of particulate matter in the liquid wash stream and/or the exiting flue gas stream. It may also be advantageous to operate the activated carbon reactor in a moving bed or fluidized bed mode to reduce the impact of particulate matter on the bed of activated carbon.

Particulate matter (PM) removal is normally achieved with either an electrostatic precipitator (ESP) or a bag house type of filter when processing large volumes of flue gas. Following filtration flue gas typically proceeds to a wet FGD or is vented in the stack. More thorough PM removal may be needed in the case of the present invention because the flue gas must also proceed to compression and/or activated carbon reaction stages before proceeding onto further processing steps such as separation and sequestration.

Additional PM filtration may be used to control particulate matter in the form of additional ESP or bag house capacity and/or efficiency at atmospheric pressure before the flue gas proceeds to compression and/or activated carbon reaction stages. Additional PM filtration may also be added at elevated pressure before or after the activated carbon reactor to remove PM remaining in the flue gas or produced in the flue gas treatment equipment. This may include using a direct contact liquid-gas contacting device operating at elevated pressure to remove particulates at some point before the activated carbon SOx removal system.

Reliability of particulate matter removal is expected to be very important due to potential problems with the compressors and reactors which are not included for treatment of typical flue gas. Other PM removal methods such as venturi scrubbers, cyclonic separation, etc may be used as the sole PM separation technique or to supplement more traditional PM removal methods. These other PM removal methods may offer higher efficiency particle removal or may be better suited for particulate removal at elevated pressure as compared to bag house or ESP particulate removal techniques.

Gas streams saturated or nearly saturated in water vapor may also contain particulate matter which may be prone to sticking on solid surfaces. For example, this may occur on the blades or other surfaces inside a compressor where flue gas enters the compressor. Particulate matter accumulation can then decrease the compressor efficiency and lead to lower reliability. It may be advantageous to add a dryer or flue gas superheater before compressors or other equipment to reduce the likelihood of PM adhering to solid surfaces.

Subambient-Temperature Processing

The NOx-lean $SO_2$-depleted flue gas stream 111 is fed to stage 60 for separation of $O_2$, $N_2$ and argon, as well as NOx and CO if present, from the carbon dioxide. Preferably the process used in this stage employs subambient-temperature processing, such as: partial condensation followed by distillation; partial condensation followed by phase separation; first partial condensation followed by phase separation followed by further partial condensation of the gas stream from the first partial condensation followed by further phase separation.

Examples of preferred subambient-temperature processes are illustrated in FIGS. 4-9. Referring first to FIGS. 4-7, feed stream 111 from stage 60 and specifically from absorber 9 is introduced into a main heat exchanger 224 in which it is partly cooled and then introduced into a reboiler 226 that serves to produce boil up or initiate an ascending vapor phase within distillation column 228. Feed stream 111 is then again introduced into main heat exchanger 224 in which it is fully cooled to at least partially liquefy carbon dioxide in stream 111. The stream 111 is then introduced through an expansion valve 230 into column 228 to initiate a descending liquid phase within such column.

In a manner well known in this art, column 228 preferably has structured packing to contact the ascending vapor phase flowing up through the packing with a descending liquid flow of the liquid phase. Other vapor-liquid contacting elements known in the art could be used such as sieve trays. As a result of the contact, the descending liquid phase becomes evermore rich in carbon dioxide, the less volatile component and the ascending vapor phase becomes evermore rich in impurities that have a higher volatility than the carbon dioxide. Column 228 produces a carbon dioxide-lean column overhead stream 231 and a carbon dioxide-rich, liquid column bottom stream 244.

Column overhead stream 231 from column 228 is then passed through an auxiliary heat exchanger 232 so that the carbon dioxide in overhead stream 231 is at least partially liquefied. The carbon dioxide overhead stream 231 is then passed through a phase separator 234 to produce a carbon dioxide-depleted vapor stream 68 and a carbon dioxide-rich liquid stream 238. Carbon dioxide-rich liquid stream 238 is expanded through an expansion valve 240. Expansion through valve 240 provides refrigeration for the partial liquefaction of carbon dioxide overhead stream 231. Expanded stream 238 and stream 68 are passed through auxiliary heat exchanger 232 and through main heat exchanger 224.

Stream 68 is passed to stage 70 which is described herein. Stream 238 after having passed through main heat exchanger 224 can be combined with stream 68 and fed to stage 70, or stream 238 can be recycled (not shown) to the inlet of an appropriate stage of a compressor 30.

A carbon dioxide product stream 244 as a liquid can be extracted from column 228 and is composed of carbon dioxide-rich liquid column bottoms. The carbon dioxide product stream 244 can then be expanded in an expansion valve 246 to generate refrigeration for the process and can thereafter be vaporized within main heat exchanger 224 and compressed in a product compressor 95 to produce a compressed carbon dioxide stream 100 as the carbon dioxide product. The product compressor 95 could be a multi-stage compressor with interstage cooling.

In the embodiment depicted in FIG. 5, carbon dioxide product stream 244 is not expanded all at the same pressure but is split into subsidiary streams 252 and 254 and at least the subsidiary stream 252 is expanded by the use of expansion valve 256 to a pressure lower than the pressure to which stream 254 is expanded. Streams 252 and 254 are expanded to their respective expanded pressures by the use of expansion valves 256 and 258, respectively, which have different orifices for such purposes. Both subsidiary streams 252 and 254 are then vaporized in main heat exchanger 224. The resultant lower pressure subsidiary stream 262 is introduced into the inlet of product compressor 95. The higher pressure subsidiary stream 264 is introduced into an intermediate stage of product compressor 95. The compressed product stream 100 is recovered from compressor 95.

In the embodiment depicted in FIG. 6, column overhead stream 231 can simply be passed into main heat exchanger 224. This recovers refrigeration from column overhead stream 231.

Figure 7:
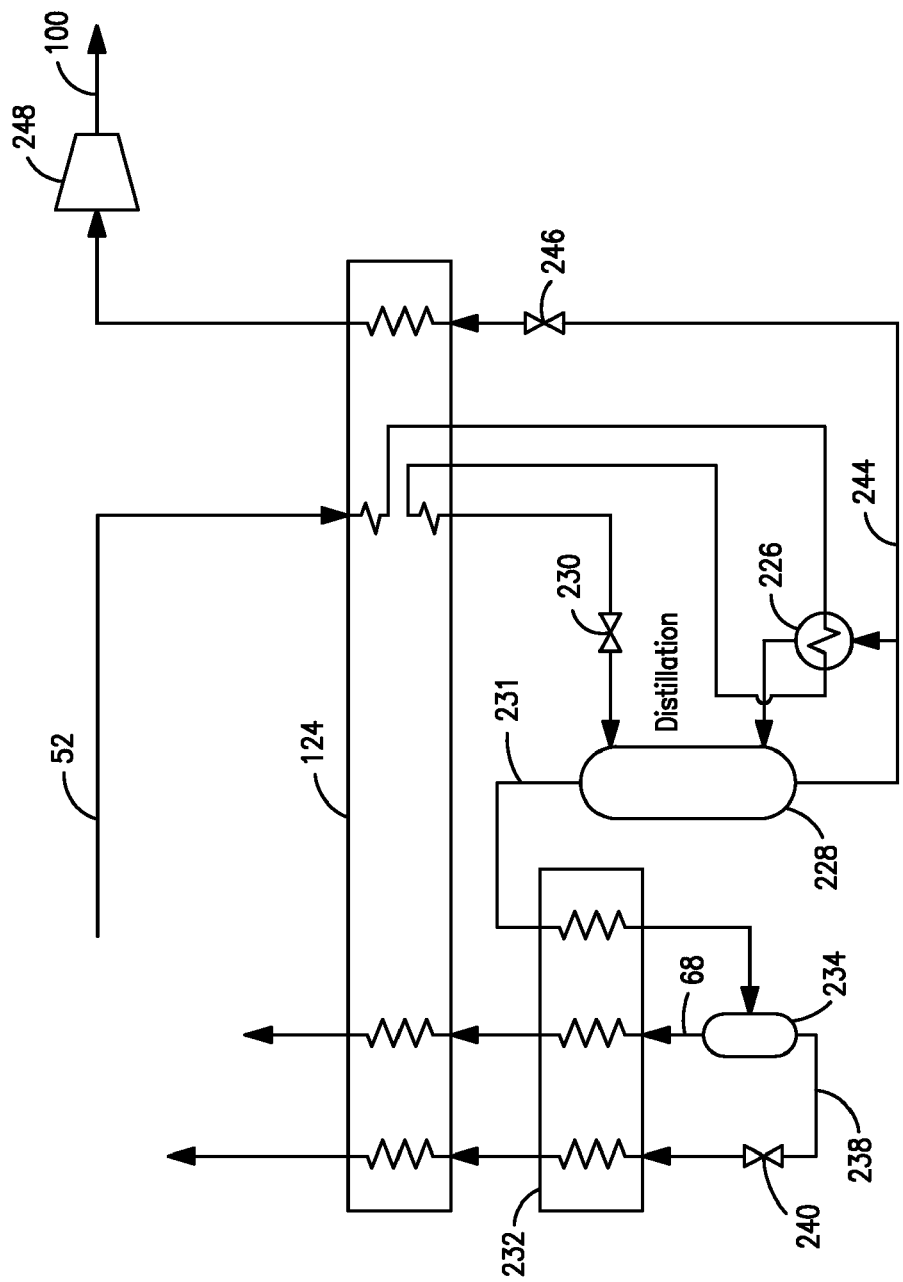
FIG. 7 is a diagram of an embodiment of a subambient-temperature processing unit useful in the method of the present invention.

In the embodiment depicted in FIG. 7, feed stream 111 after expansion through valve 230 is introduced into a phase separator 260 to produce a vapor phase stream 2262 and a liquid phase stream 2264. Liquid phase stream 2264 is introduced into column 228 to produce the carbon dioxide containing column bottoms 244 and vapor phase stream 231 which can be combined with stream 2262 and passed through auxiliary heat exchanger 232 as described in connection with the embodiment of the invention described with respect to FIG. 4. Phase separator 260 could be used in any embodiment of the present invention.

Figure 8:
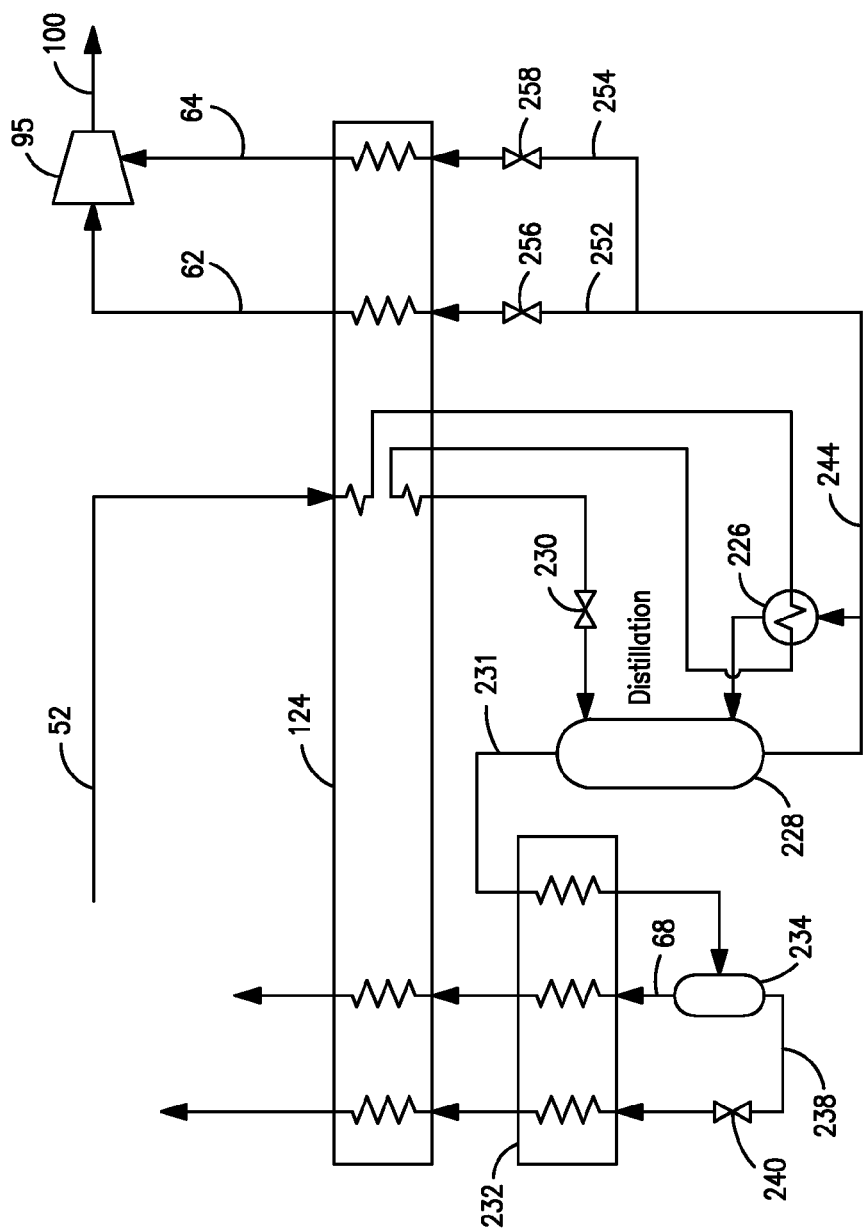
FIG. 8 is a diagram of another embodiment of a subambient-temperature processing unit useful in the method of the present invention.

FIG. 8 shows an alternative configuration of subambient-temperature processing based on partial condensation followed by one stage of phase separation. Feed stream 111 is cooled in a heat exchanger 224 against cold streams being warmed. Feed stream 111 is cooled to 0° F. to –70° F. to partially condense it and is then fed to a phase separator 129. A carbon dioxide product stream with >90% purity (by volume), preferably >95% purity, is withdrawn as a liquid stream 145. A carbon dioxide-lean stream from the phase separator 129 is recovered as a gaseous stream 161. The liquid stream 145 is expanded through at least one expansion valve 256. It will be advantageous to split stream 145 into two separate streams 252 and 254 and expand them through two expansion valves 256 and 258 to two different pressures. The pressure to which the carbon dioxide liquid product is expanded is usually 50 to 300 psia lower than the pressure of feed 111 to the subambient-temperature processing unit. The resultant expanded carbon dioxide product streams 262 and 264 and gaseous stream 161 are warmed through heat exchanger 224. The carbon dioxide-lean stream 68 is then fed to adsorption based or absorption based separation in unit 70. The carbon dioxide product streams 262 and 264 can be compressed and recovered as described herein.

Figure 9:
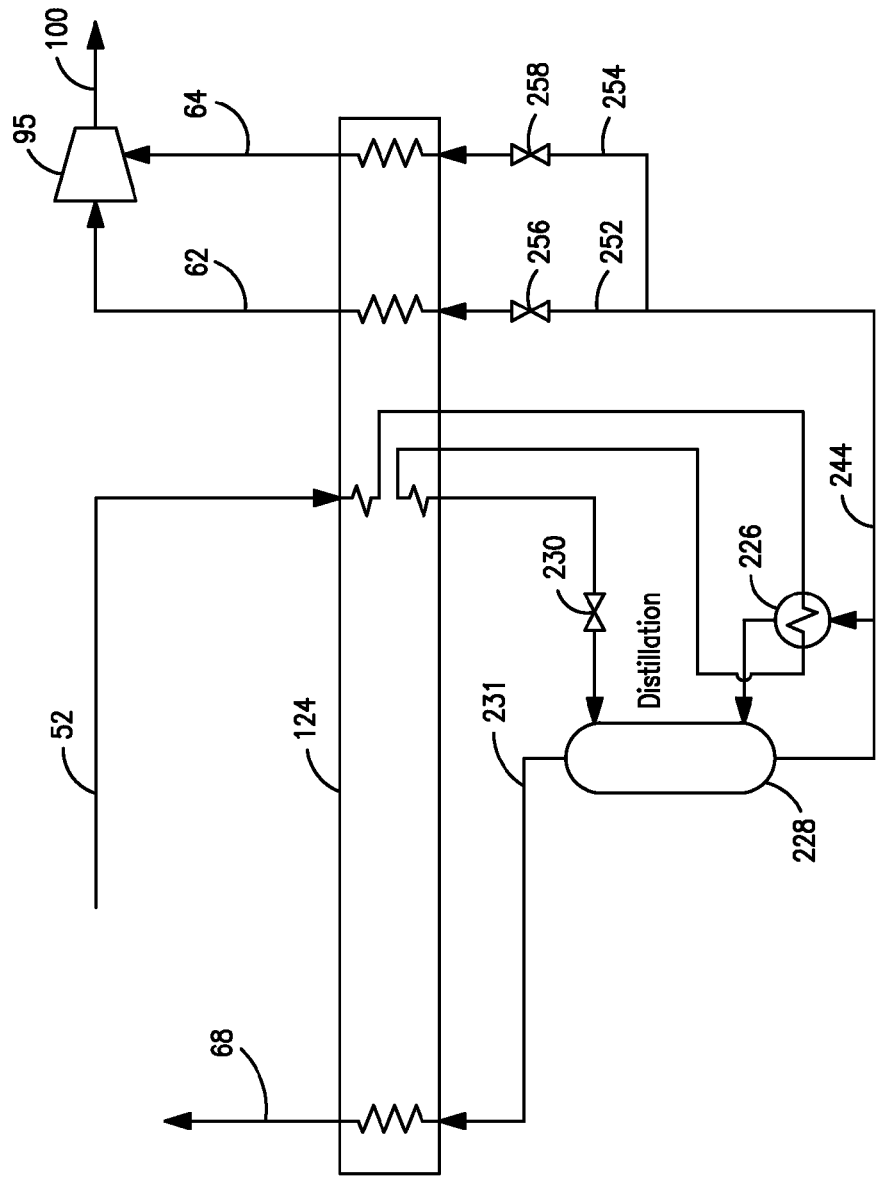
FIG. 9 is a diagram of another embodiment of a subambient-temperature processing unit useful in the method of the present invention.

FIG. 9 shows another embodiment of subambient-temperature processing where partial condensation is followed by two stages of phase separation. The feed stream 111 is first cooled in heat exchanger 224 to 0° F. to –40° F. to cause partial condensation, and is then fed to a phase separator 129. The first carbon dioxide product is recovered as liquid stream 153 and expanded through expansion valve 256. The vapor stream 161 from phase separator 129 is further cooled in another heat exchanger 2264 to –20° F. to –70° F. to partially condense it. The partially condensed stream 161 is then fed to another phase separator 139. A second product carbon dioxide stream is recovered as liquid stream 155 which is expanded through expansion valve 258. Further carbon dioxide-depleted vapor stream 163 is recovered from the phase separator 139. The expanded second carbon dioxide product stream 155 and vapor stream 163 are warmed through heat exchangers 2264 and 224 and the expanded first carbon dioxide product stream 153 is warmed through heat exchanger 224. The carbon dioxide-lean stream 68 and the two carbon dioxide product streams 262 and 264 are further processed as described herein.

Purified carbon dioxide is obtained from the subambient-temperature processing in one stream or in two streams such as streams 262 and 264 which may be at the same pressure or at two different pressures. The purified carbon dioxide stream or streams can if desired be compressed in e.g. a multistage compressor 95 to a pressure of 500 to 3000 psia, preferably to 1500 to 2500 psia. Such compression is desirable for pipeline transport or other disposition of the stream. The purity of carbon dioxide is generally greater than 95%. Using the subambient-temperature process, 60-93% of carbon dioxide contained in stream 111 is recovered as product carbon dioxide in stream 100. The extent of recovery depends on the concentration of carbon dioxide in stream 111. The remaining carbon dioxide is contained in vent stream 68, which is usually at pressure close to the pressure of feed stream 111. The concentration of carbon dioxide in vent stream 68 is usually in the 25-40% range.

Processing of Stream 68

As illustrated in FIG. 1, stream 68 is then fed to unit 70 where it undergoes further separation, by adsorption, by physical absorption or by chemical absorption. Unit 70 produces a carbon dioxide-rich stream 19 at 15-20 psia and carbon dioxide depleted stream 72 at essentially the pressure of stream 68 that was fed to unit 70. The carbon dioxide-rich stream 19 is recycled and mixed with flue gas stream 105, 106, 107 or 108. By recovering additional carbon dioxide from vent stream 68 by processing in unit 70 and recycling it, the overall carbon dioxide recovery can be increased to the range of 96-99%. Thus, the product stream 100 contains 96% to 99% of the carbon dioxide contained in flue gas stream 101.

Adsorption

In this embodiment, vent stream 68 is passed on to a vacuum pressure swing adsorption (VPSA) unit 70. The VPSA unit contains multiple beds containing adsorbent that selectively adsorbs carbon dioxide. The VPSA unit produces a carbon dioxide-rich stream 19 at 15-20 psia and the carbon dioxide depleted stream 72 at essentially the pressure of stream 68 that was fed to the VPSA.

After the carbon dioxide concentration is increased by multiple depressurizations in unit 70 it can be used to produce the carbon dioxide product by further pressure reduction. For some adsorbents, depressurization from high to low pressure increases carbon dioxide concentration in the adsorbent bed. This step in the process can be used to eliminate several process steps as described in the prior art. Consequently, several pieces of rotating machinery (e.g., rinse compressor, purge compressor, recycle compressor) and associated power requirements can be eliminated, thus providing a process and system that enhances operation and improves efficiency.

Figure 12:
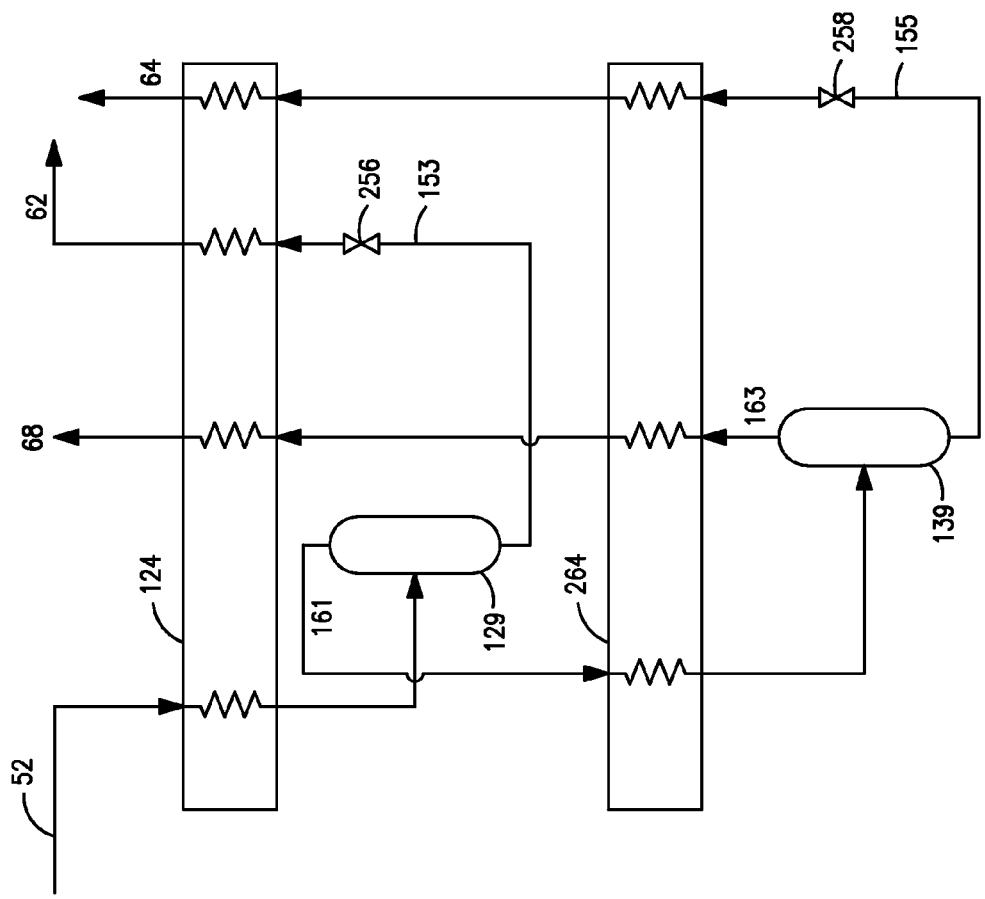
FIG. 12 is a diagram of another embodiment of a subambient-temperature process useful in the method of the present invention.
Figure 13:
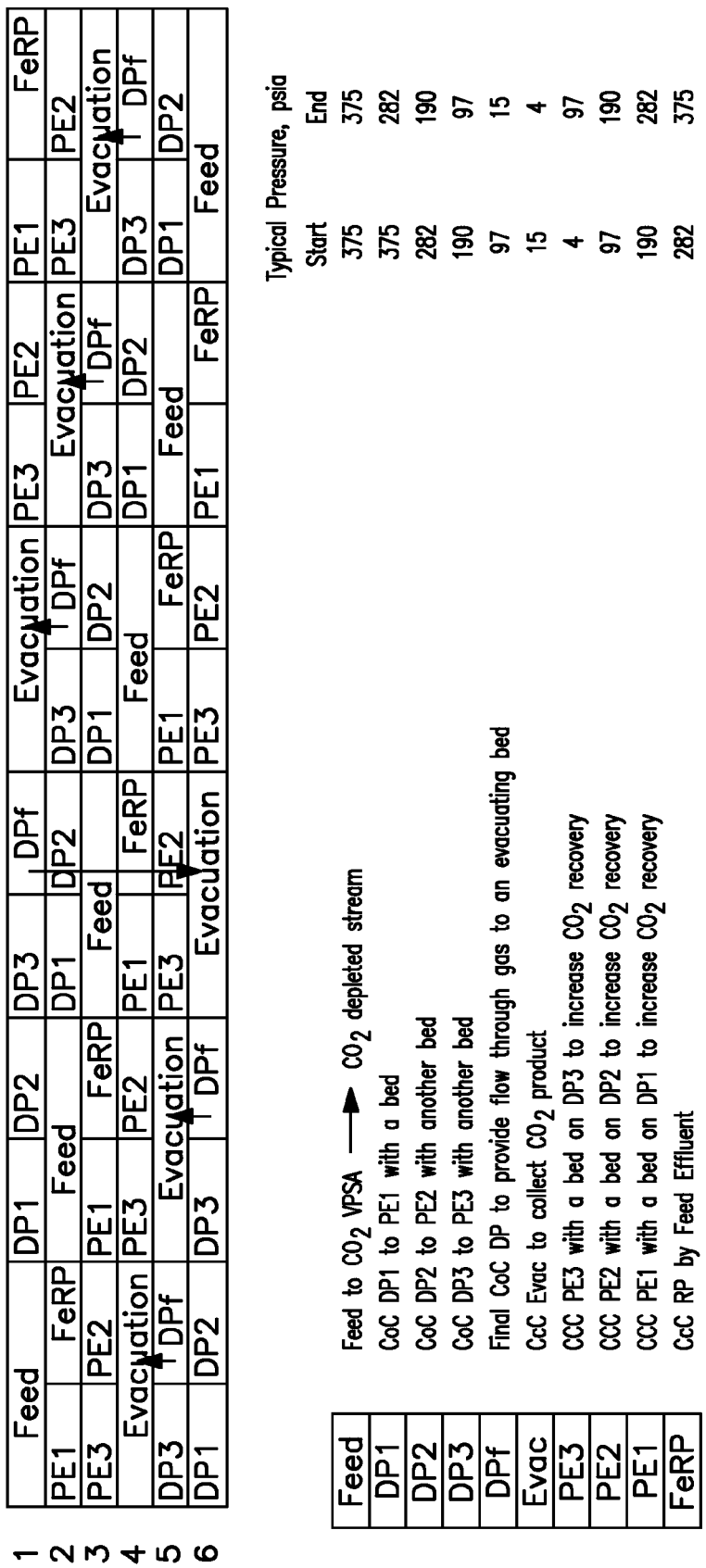
FIG. 13 illustrates a cycle step chart for a carbon dioxide VPSA unit having six beds, three pressure equalization steps and flow through the evacuating bed, useful in the present invention.
Figure 14:
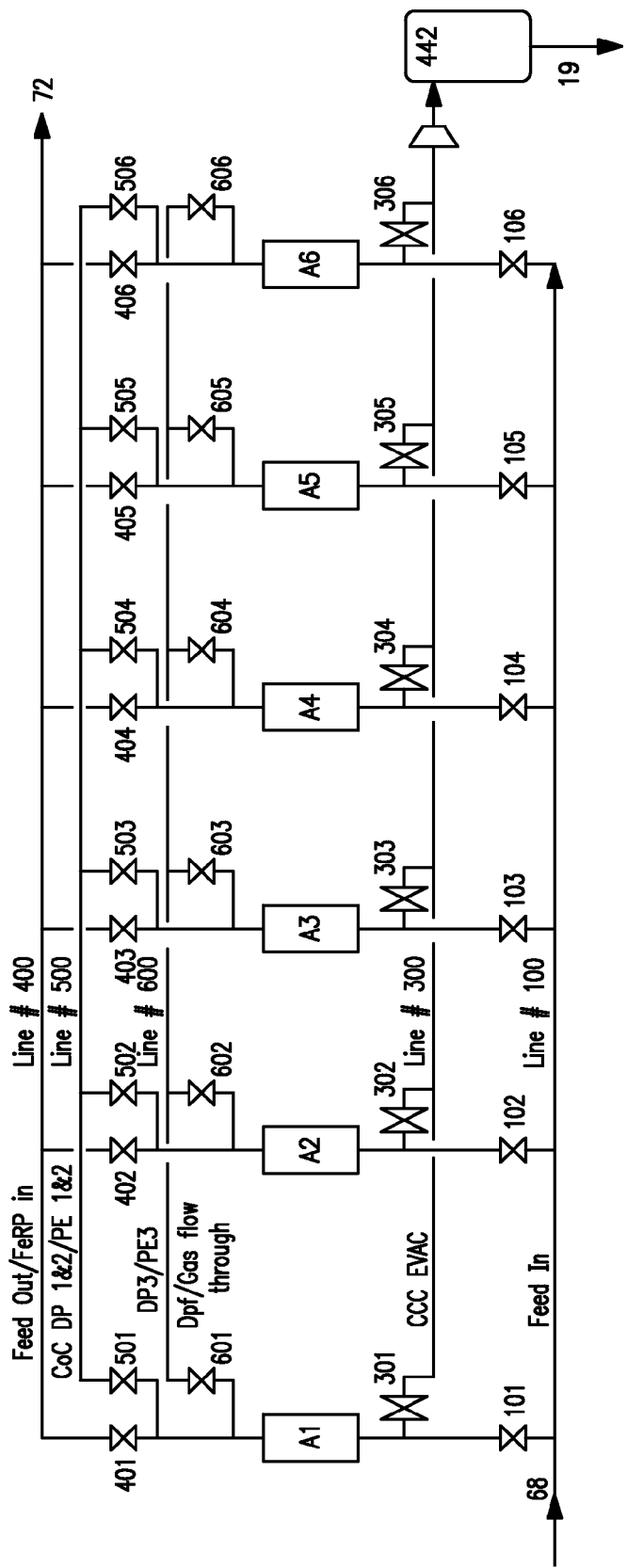
FIG. 14 shows a schematic drawing for a carbon dioxide VPSA unit of FIG. 13.

In one embodiment of VPSA stage 70, the processes provide for flow through the evacuating bed (see for example, FIGS. 10-14). The flow through embodiments can be accomplished using a varying number of beds and pressure equalization steps. For example, flow through the evacuating bed can be accomplished with six beds and three pressure equalization steps (FIGS. 10-14). Alternatively, flow through the evacuating bed can be accomplished with five beds and two pressure equalization steps (FIG. 13) or seven beds and three pressure equalization steps (FIG. 14). At any time during any of these processes, the beds will be in one of the following categories of steps: feed, depressurizations, evacuation, pressure equalizations, and repressurization. In addition, a purge step can be included in the cycle for the embodiment shown in FIG. 14.

Figure 17:
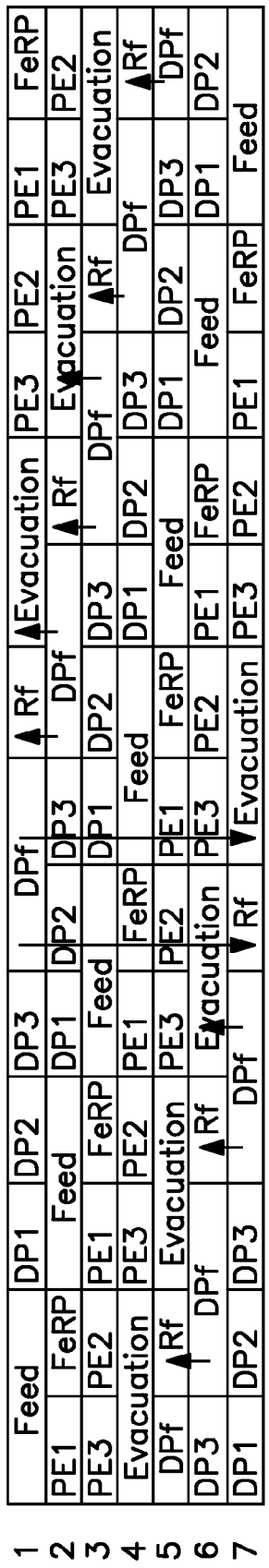
FIG. 17 illustrates another alternative cycle step chart for a carbon dioxide VPSA unit having seven beds, three pressure equalization steps and flow through the evacuating bed, useful in the present invention.

In other alternative embodiments, the carbon dioxide product produced during the final depressurization step (DPf) is not passed through another bed under evacuation. Rather, this stream is mixed directly with the stream from the evacuating bed. In one preferred and exemplary embodiment, this can be accomplished with a carbon dioxide VPSA unit having six beds and three pressure equalization steps (FIGS. 15-17). In other embodiments, this can be accomplished by using a carbon dioxide VPSA unit having five beds and two pressure equalization steps (FIG. 18). At any time during any of these processes, the beds will be in one of the following categories of steps: feed, depressurizations, evacuation, pressure equalizations, and repressurization.

Combinations of flow through and direct mixing can also be used. In such embodiments, a portion of the stream produced during the depressurization step (DPf) flows through the bed under evacuation and the remainder is directly mixed with the stream exiting the bed under evacuation.

Figure 19:
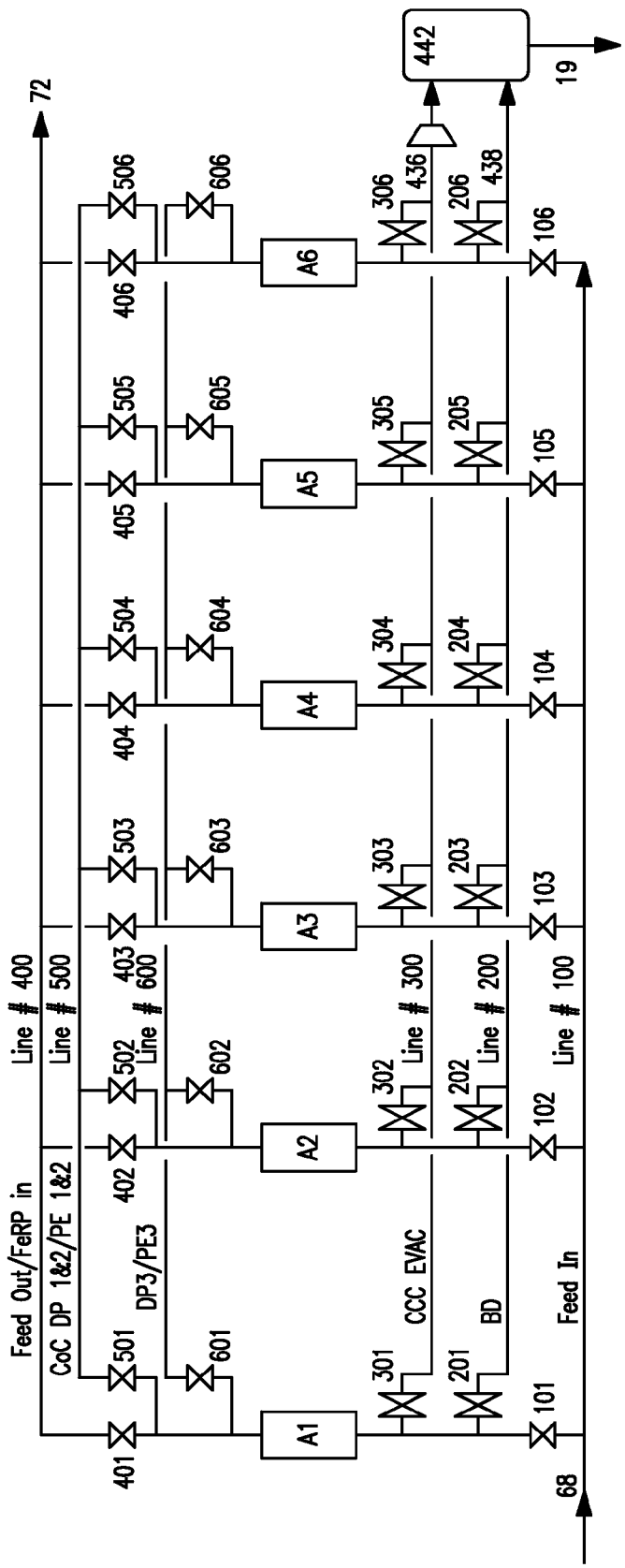
FIG. 19 shows a schematic drawing for the carbon dioxide VPSA unit of FIG. 18.
Figure 20:
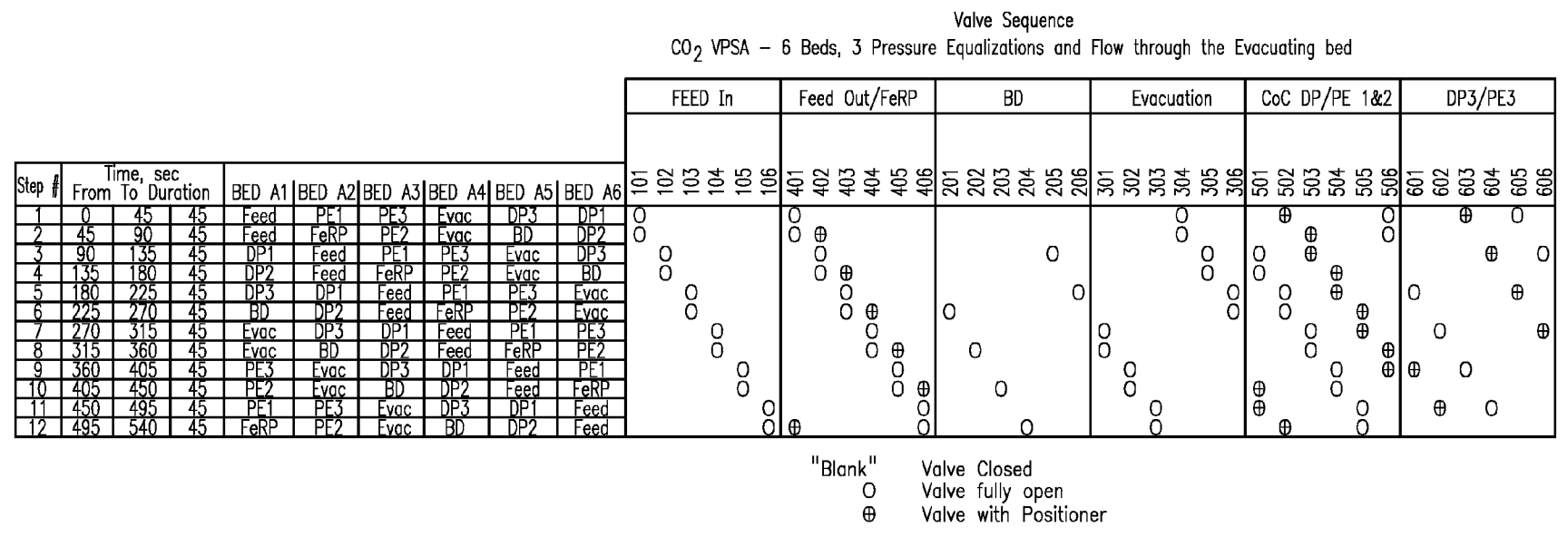
Figure 24:
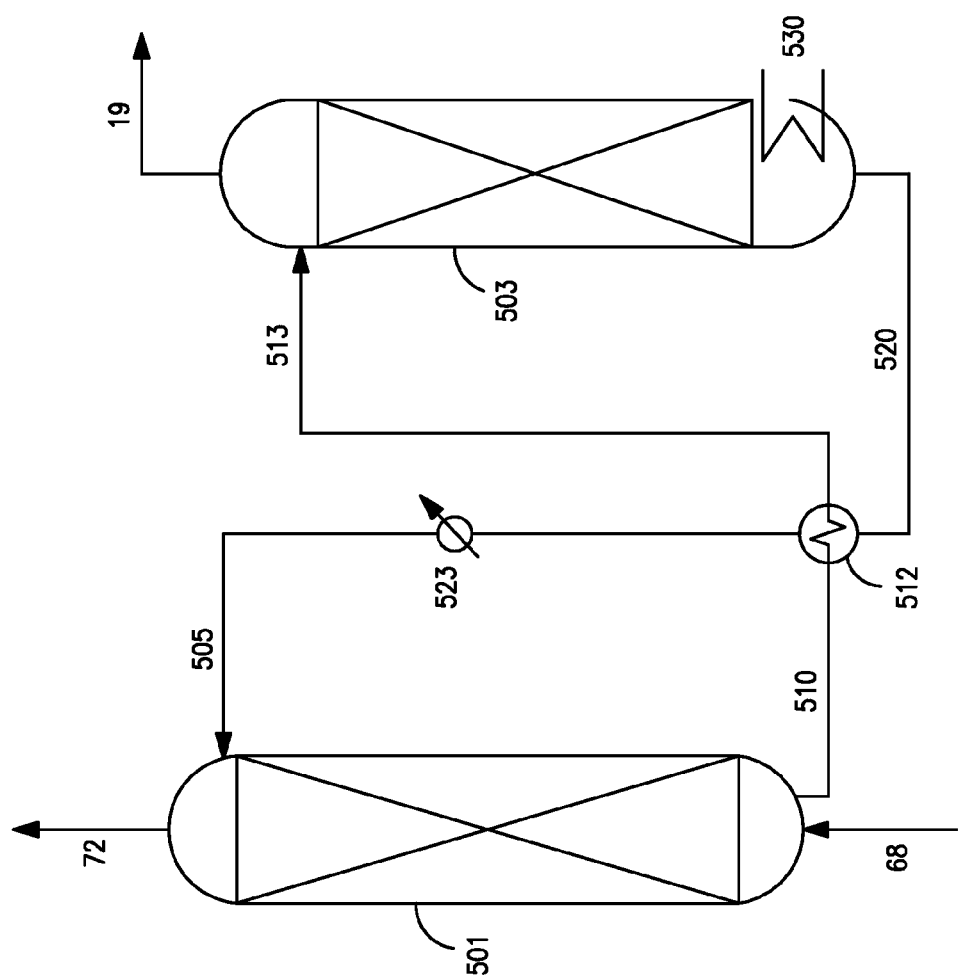
FIG. 24 is a diagram of a process useful in employing absorption in the method of the present invention.

In embodiments where increased plant capacity is desirable, the embodiments shown in FIGS. 19 and 20 can be utilized. More specifically, FIG. 19 shows a cycle step chart for an embodiment of the present invention in which two pressure equalizations and eight beds are used with direct mixing. In this embodiment, two beds are continuously on feed and at least two beds are continuously under evacuation. This arrangement is expected to allow for an increase in the capacity of the plant. FIG. 20 illustrates a cycle step chart for an embodiment of the present invention in which two pressure equalizations and eleven beds are used with direct mixing. In this embodiment, three beds are continuously on feed and two beds are continuously under evacuation. This arrangement is also expected to allow for an increase in the capacity of the plant. At any time during any of these processes, the beds will be in one of the following categories of steps: feed, depressurizations, evacuation, pressure equalizations, and repressurization.

In any of the embodiments, each bed is preferably packed with at least two layers of adsorbents. The type and sizing of the adsorbent layer toward the feed end (i.e. a water-selective adsorbent layer) in the bed is selected to remove moisture in the feed stream such that any residual moisture does not deteriorate the performance of the main (i.e., carbon dioxide-selective) adsorbent layer. The water-selective adsorbent layer is also preferably capable of removing impurities (e.g., trace amounts of sulfur or heavy hydrocarbon compounds) from the feed stream, to the extent such impurities are present. The main, second adsorbent layer (i.e., the carbon dioxide-selective adsorbent layer) is used for selectively adsorbing carbon dioxide from the feed stream after sufficient moisture has been removed.

For the first adsorbent layer (i.e. the water-selective adsorbent layer, adsorbents such as activated alumina, silica gel or zeolite molecular sieve are preferred. These adsorbents are intended to be illustrative and other adsorbents capable of removing sufficient moisture are also suitable for use in accordance with the present invention. Preferred characteristics for such adsorbent(s) include: high crush strength capabilities, high attrition resistance, large bulk density, low inter-particle void, high heat capacity, large thermal conductivity, low-pressure drop and stable in liquid water.

The main layer of adsorbent (i.e., the carbon dioxide-selective adsorbent layer) following the water-selective adsorbent layer preferably has the following characteristics: high selectivity, high working capacity, fast kinetics and low heat of adsorption. Typical examples of such adsorbents include, but are not limited to: are NaY, HY, NaX, silica gel, and activated carbon. Other desired physical properties of the main layer adsorbent (i.e. the carbon dioxide-selective layer) include: high crush strength, high attrition resistance, large bulk density, low inter-particle void, high heat capacity, large thermal conductivity and low-pressure drop during the feed and evacuation steps.

Those skilled in the art will appreciate that a composite mixed layer containing both adsorbents could be used in the present invention so long as the characteristics of the adsorbents are satisfied.

Figure 10:
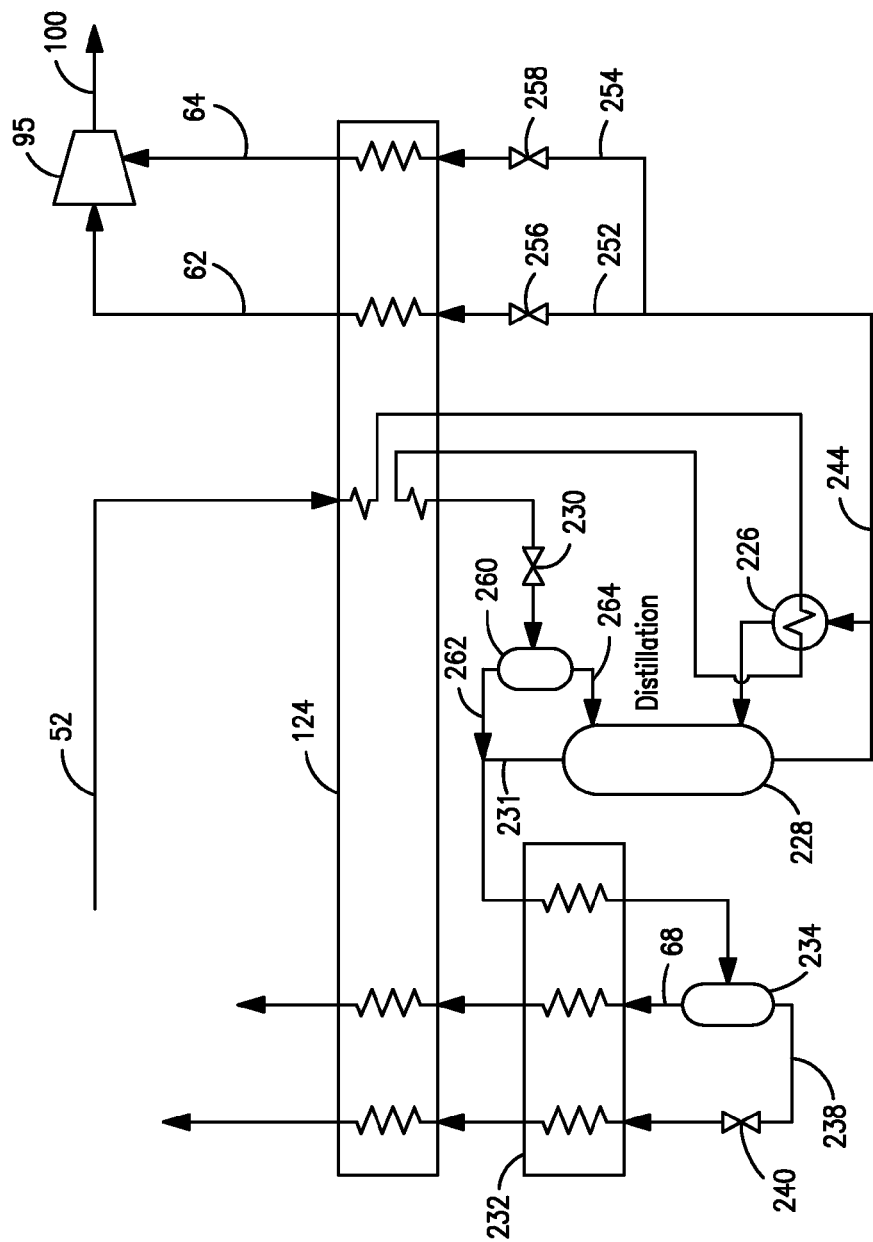
FIG. 10 is a diagram of another embodiment of a subambient-temperature processing unit useful in the method of the present invention.
Figure 11:
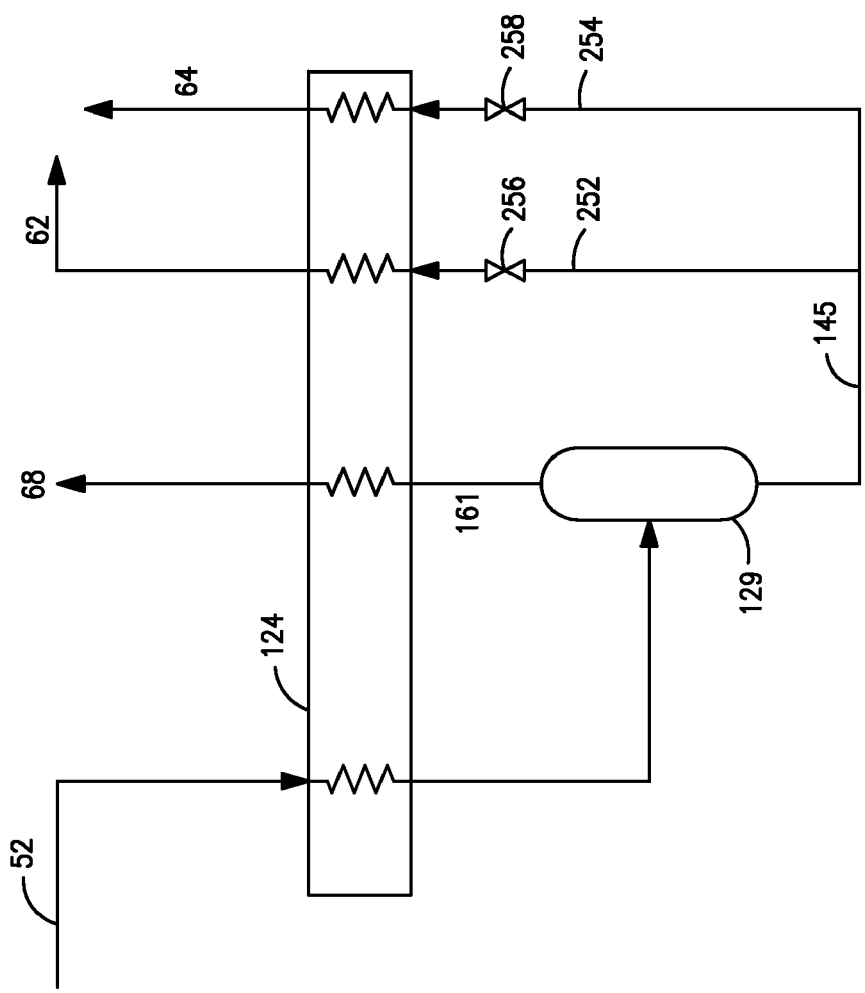
FIG. 11 is a diagram of another embodiment of a subambient-temperature process useful in the method of the present invention.

Referring now to FIGS. 10-12, a first embodiment of the present invention having six beds (A1-A6) and using ten steps with flow through the evacuating bed to produce enriched carbon dioxide is illustrated. The process steps include:

1. Feed Step. Feed stream 68 containing carbon dioxide at a high pressure between about 100-500 psia (for example, about 375 psia) is fed to the carbon dioxide VPSA unit. After a predetermined time or after carbon dioxide breakthrough from the bed on the feed 68, the feed step is terminated.

2. Co-Current (CoC) Depressurization 1 (DP1). The carbon dioxide VPSA bed, which has finished the feed step is now at high feed pressure (e.g., 100-500 psia), is depressurized to a medium pressure (e.g., 80-400 psia) in a direction the same (shown in FIG. 10) or opposite (not shown in FIG. 10) as the feed flow.

3. Co-Current (CoC) Depressurization 2 (DP2). The carbon dioxide VPSA bed, which is now at some medium pressure (e.g., 80-400 psia), is further depressurized to a lower pressure (e.g., 60-300 psia) in a direction the same as (shown in FIG. 10) or opposite (not shown in FIG. 10) as the feed flow.

4. Co-Current (CoC) Depressurization 3 (DP3). The carbon dioxide VPSA bed, which is now at some medium pressure (e.g., 60-300 psia), is further depressurized to a lower pressure (e.g., 50-200 psia) in a direction the same as (shown in FIG. 10) or opposite (not shown in FIG. 10) as the feed flow.

5. Final Depressurization (DPf). The carbon dioxide VPSA bed, which is now at a pressure lower than at the start of step 4 (about 50-200 psia) is further depressurized to a pressure close to ambient (about 20 psia) in a direction the same as (shown in FIG. 10) and/or the opposite (not shown in FIG. 10) the feed flow.

As shown by the arrows in FIG. 10 (i.e. arrows from DPf to bed under evacuation), the stream from this step (DPf) flows through the bed under evacuation (e.g. in FIG. 10: bed 1 to bed 6, bed 2 to bed 1, bed 3 to bed 2, bed 4 to bed 3, bed 5 to bed 4 or bed 6 to bed 5 on the respective cycle steps).

6. Evacuation. The carbon dioxide VPSA bed, which is now close to ambient pressure (about 20 psia), is evacuated to a predetermined low pressure, a subambient pressure (about 1-12 psia) in a direction the same as (not shown in FIG. 10) or opposite (shown in FIG. 10) to the feed flow. As shown in FIG. 10 and outlined in the description of step 5 (DPf) above, this bed is receiving gas from another bed in the DPf step. The gas from the bed under evacuation constitutes the carbon dioxide product stream.

7. Countercurrent (CcC) Pressure Equalization 3 (PE3). The evacuated bed is now pressure equalized to a pressure range of the gas produced in step 4 (DP3) (i.e., to about 50-200 psia) in a direction the same as (not shown in FIG. 10) or opposite (shown in FIG. 10) to the feed flow. This step increases carbon dioxide recovery by keeping the carbon dioxide from step 4 within the VPSA system. This minimizes carbon dioxide loss by eliminating the need to send the carbon dioxide to a waste stream.

8. Countercurrent (CcC) Pressure Equalization 2 (PE2). The bed pressure equalized in step 7 is now pressure equalized to a pressure range of the gas produced in step 3 (DP2) (i.e., to about 60-300 psia) in a direction the same as (not shown in FIG. 10) or opposite (shown in FIG. 10) to the feed flow. This step increases carbon dioxide recovery by keeping the carbon dioxide from step 3 within the VPSA system. This minimizes carbon dioxide loss by eliminating the need to send the carbon dioxide to a waste stream.

9. Countercurrent Pressure (CcC) Equalization 1 (PE1). The bed pressure equalized in step 8 is further pressure equalized to a pressure range of the gas produced in step 2 (DP1) (i.e., to about 80-400 psia) in a direction the same as (not shown in FIG. 10) or opposite (shown in FIG. 10) to the feed flow. This step further increases carbon dioxide recovery by keeping the carbon dioxide from step 2 within the VPSA system. This minimizes carbon dioxide loss by eliminating the need to send the carbon dioxide to a waste stream.

10. Repressurization (FeRP). The pressure-equalized bed is repressurized to a feed pressure (100-500 psia) either by the feed gas or by part of the effluent generated from another bed in step 1 (i.e. feed effluent). Following repressurization to feed pressure, this bed is now ready to go back to step 1.

The ten-step process described is for one cycle for one bed in the carbon dioxide VPSA unit. The above ten steps for this flow through the evacuating bed embodiment are carried out in a cyclic manner with the other beds in the unit such that feed-into and feed-effluent from step 1 are continuous. In addition, the evacuation step (number 6) is designed to be continuous. This ensures that the vacuum pump operates continuously, and that there is no break in feed-into the carbon dioxide VPSA unit. Six adsorption beds are utilized in the embodiment described above to maintain the continuity of the key process steps.

Exemplary corresponding hardware and a flow schematic of the carbon dioxide VPSA process corresponding to the cycle shown in FIG. 10 is depicted in FIG. 11. The various valves in FIG. 11 can be operated in the manner illustrated in FIG. 12 to carry out the ten steps in the six-bed process as described hereinabove. It should be appreciated that pressures and step durations shown are only for illustrative purposes. Those skilled in the art will appreciate that other combinations of pressures and step durations may be used.

As can be appreciated from the above description, the present invention thus relies upon depressurizations of at least one carbon dioxide-selective adsorbent from high pressure to low pressure to increase carbon dioxide concentration in the bed. After carbon dioxide concentration is increased, it produces the carbon dioxide product by further pressure reduction. This became possible based on the recognition that for some adsorbents, pressure reduction from high to low pressure increases carbon dioxide concentration on the adsorbent.

In the embodiment shown in FIGS. 10-12 and as described, the gas produced during the final depressurization (step number 5, DPf) flows through the bed under evacuation as shown by the arrows in the cycle step chart in FIG. 10.

Alternative and additional exemplary embodiments that utilize the final depressurization gas stream (DPf) flow through the evacuating bed are illustrated in FIGS. 13 and 14.

Referring now to FIG. 13, a cycle step chart for an eight-step process that utilizes five beds and two pressure equalization steps is shown. These cycle steps are carried out in a similar to those steps described above with reference to FIG. 10, except that steps DP3 and PE3 have been eliminated. More specifically, the cycle steps for FIG. 13 include the following:

1. Feed Step. Feed stream 68 containing carbon dioxide at a high pressure between about 100-500 psia (for example, about 375 psia) is fed to carbon dioxide VPSA unit 70. After a predetermined time or after carbon dioxide breakthrough from the bed on the feed 68, the feed step is terminated.

2. Co-Current (CoC) Depressurization 1 (DP1). The carbon dioxide VPSA bed, which has finished the feed step is now at high feed pressure (e.g., 100-500 psia), is depressurized to a medium pressure (e.g., 80-400 psia) in a direction the same (shown in FIG. 13) or opposite (not shown in FIG. 13) as the feed flow.

3. Co-Current (CoC) Depressurization 2 (DP2). The carbon dioxide VPSA bed, which is now at some medium pressure (e.g., 80-400 psia), is further depressurized to a lower pressure (e.g., 60-300 psia) in a direction the same as (shown in FIG. 13) or opposite (not shown in FIG. 13) as the feed flow.

4. Final Depressurization (DPf). The carbon dioxide VPSA bed, which is now at a pressure lower than at the start of step 4 (about 50-200 psia) is further depressurized to a pressure close to ambient (about 20 psia) in a direction the same as (shown in FIG. 13) and/or the opposite (not shown in FIG. 13) the feed flow.

As shown by the arrows in FIG. 13 (i.e. arrows from DPf to bed under evacuation), the stream from this step (DPf) flows through the bed under evacuation (e.g. as shown in FIG. 13: bed 1 to bed 5, bed 2 to bed 1, bed 3 to bed 2, bed 4 to bed 3 or bed 5 to bed 4 on the respective cycle steps).

5. Evacuation. The carbon dioxide VPSA bed, which is now close to ambient pressure (about 20 psia), is evacuated to a predetermined low pressure, a subambient pressure (about 1-12 psia) in a direction the same as (not shown in FIG. 13) or opposite (shown in FIG. 13 to the feed flow. As shown in FIG. 13 and as outlined in the description of step 4 (DPf) above, this bed is receiving gas from another bed in the DPf step for the duration of the DPf step. The gas from the bed under evacuation constitutes the carbon dioxide product stream.

6. Countercurrent (CcC) Pressure Equalization 2 (PE2). The evacuated bed is now pressure equalized to a pressure range of the gas produced in step 3 (DP2) (i.e., to about 60-300 psia) in a direction the same as (not shown in FIG. 13) or opposite (shown in FIG. 13) to the feed flow. This step increases carbon dioxide recovery by keeping the carbon dioxide from step 3 within the VPSA system. This minimizes carbon dioxide loss by eliminating the need to send the carbon dioxide to a waste stream.

7. Countercurrent Pressure (CcC) Equalization 1 (PE1). The bed pressure equalized in step 6 is further pressure equalized to a pressure range of the gas produced in step 1 (DP1) (i.e., to about 80-400 psia) in a direction the same as (not shown in FIG. 13) or opposite (shown in FIG. 13) to the feed flow. This step further increases carbon dioxide recovery by keeping the carbon dioxide from step 2 within the VPSA system. This minimizes carbon dioxide loss by eliminating the need to send the carbon dioxide to a waste stream.

8. Repressurization (FeRP). The pressure-equalized bed is repressurized to a feed pressure (100-500 psia) either by the feed gas or by part of the effluent generated from another bed in step 1 (i.e. feed effluent). Following repressurization to feed pressure, this bed is now ready to go back to step 1.

The eight-step process described is for one cycle for one bed in the carbon dioxide VPSA unit. The above eight steps for this flow through the evacuating bed embodiment are carried out in a cyclic manner with the other beds in the unit such that feed-into and feed-effluent from step 1 are continuous. In addition, the evacuation step (number 5) is designed to be continuous. This ensures that the vacuum pump operates continuously, and that there is no break in feed-into the carbon dioxide VPSA unit. Five adsorption beds are utilized in the embodiment described above to maintain the continuity of the key process steps.

Referring now to FIG. 14, a cycle step chart for an eleven-step process that utilizes seven beds and three pressure equalization steps is shown. These cycle steps are carried out in a similar manner to those steps described above with reference to FIG. 10, except that an additional step (Rf) is included between the final depressurization step (DPf) and the evacuation step. More specifically, the cycle steps for FIG. 14 include the following:

1. Feed Step. Feed stream 68 containing carbon dioxide at a high pressure between about 100-500 psia (for example, about 375 psia) is fed to carbon dioxide VPSA unit 70. After a predetermined time or after carbon dioxide breakthrough from the bed on the feed 68, the feed step is terminated.

2. Co-Current (CoC) Depressurization 1 (DP1). The carbon dioxide VPSA bed, which has finished the feed step is now at high feed pressure (e.g., 100-500 psia), is depressurized to a medium pressure (e.g., 80-400 psia) in a direction the same (shown in FIG. 14) or opposite (not shown in FIG. 14) as the feed flow.

3. Co-Current (CoC) Depressurization 2 (DP2). The carbon dioxide VPSA bed, which is now at some medium pressure (e.g., 80-400 psia), is further depressurized to a lower pressure (e.g., 60-300 psia) in a direction the same as (shown in FIG. 14) or opposite (not shown in FIG. 14) as the feed flow.

4. Co-Current (CoC) Depressurization 3 (DP3). The carbon dioxide VPSA bed, which is now at some medium pressure (e.g., 60-300 psia), is further depressurized to a lower pressure (e.g., 50-200 psia) in a direction the same as (shown in FIG. 14) or opposite (not shown in FIG. 14) as the feed flow.

5. Final Depressurization (DPf). The carbon dioxide VPSA bed, which is now at a pressure lower than at the start of step 4 (about 50-200 psia) is further depressurized to a pressure close to ambient (about 20 psia) in a direction the same as (shown in FIG. 14) and/or the opposite (not shown in FIG. 14) the feed flow.

6. Receive Purge (Rf). The stream produced by DPf (e.g., bed 1 in FIG. 14) is fed to another bed having completed DPf, but not yet under evacuation (e.g., bed 7 in FIG. 14). During this time (duration of the Rf step), the effluent (e.g., bed 7 in FIG. 14) flows to tank 442 as carbon dioxide product. During the remaining time period of DPf of bed 1, the gas flows through the bed under evacuation (e.g., bed 7 in FIG. 14).

7. Evacuation. The carbon dioxide VPSA bed, which is now close to ambient pressure (about 20 psia), is evacuated to a predetermined low pressure, a subambient pressure (about 1-12 psia) in a direction the same as (not shown in FIG. 14) or opposite (shown in FIG. 14) to the feed flow. As shown in FIG. 14, this bed (bed 1) is receiving gas from another bed in the DPf step (bed 2). The gas from the bed under evacuation constitutes at least part of the carbon dioxide product stream.

8. Countercurrent (CcC) Pressure Equalization 3 (PE3). The evacuated bed is now pressure equalized to a pressure range of the gas produced in step 4 (DP3) (i.e., to about 50-200 psia) in a direction the same as (not shown in FIG. 14) or opposite (shown in FIG. 14) to the feed flow. This step increases carbon dioxide recovery by keeping the carbon dioxide from step 4 within the VPSA system. This minimizes carbon dioxide loss by eliminating the need to send the carbon dioxide to a waste stream.

9. Countercurrent (CcC) Pressure Equalization 2 (PE2). The bed pressure equalized in step 7 is now pressure equalized to a pressure range of the gas produced in step 3 (DP2) (i.e., to about 60-300 psia) in a direction the same as (not shown in FIG. 14) or opposite (shown in FIG. 14) to the feed flow. This step increases carbon dioxide recovery by keeping the carbon dioxide from step 3 within the VPSA system. This minimizes carbon dioxide loss by eliminating the need to send the carbon dioxide to a waste stream.

10. Countercurrent Pressure (CcC) Equalization 1 (PE1). The bed pressure equalized in step 9 is further pressure equalized to a pressure range of the gas produced in step 2 (DP1) (i.e., to about 80-400 psia) in a direction the same as (not shown in FIG. 14) or opposite (shown in FIG. 14) to the feed flow. This step further increases carbon dioxide recovery by keeping the carbon dioxide from step 2 within the VPSA system. This minimizes carbon dioxide loss by eliminating the need to send the carbon dioxide to a waste stream.

11. Repressurization (FeRP). The pressure-equalized bed is repressurized to a feed pressure (100-500 psia) either by the feed gas or by part of the effluent generated from another bed in step 1 (i.e. feed effluent). Following repressurization to feed pressure, this bed is now ready to go back to step 1.

The eleven-step process described is for one cycle for one bed in the carbon dioxide VPSA unit. The above eleven steps for this flow through the evacuating bed embodiment are carried out in a cyclic manner with the other beds in the unit such that feed-into and feed-effluent from step 1 are continuous. In addition, the evacuation step (number 7) is designed to be continuous. This ensures that the vacuum pump operates continuously, and that there is no break in feed-into the carbon dioxide VPSA unit. Seven adsorption beds are utilized in the embodiment described above to maintain the continuity of the key process steps.

Referring now to FIGS. 15-17, an embodiment of the present invention having six beds (A1-A6) and using ten steps with direct mixing of carbon dioxide gas from the DPf step and the evacuation step to produce a final carbon dioxide enriched gas is illustrated. The process steps include:

1. Feed Step. Feed stream 68 containing carbon dioxide at a high pressure (for example, about 375 psia) is fed to carbon dioxide VPSA unit 70. After a predetermined time or after carbon dioxide breakthrough from the bed on the feed 68, the feed step is terminated.

2. Co-Current (CoC) Depressurization 1 (DP1). The carbon dioxide VPSA bed, which has finished the feed step is now at high feed pressure (e.g., 100-500 psia), is depressurized to a medium pressure (e.g., 80-400 psia) in a direction the same (shown in FIG. 15) or opposite (not shown in FIG. 15) as the feed flow.

3. Co-Current (CoC) Depressurization 2 (DP2). The carbon dioxide VPSA bed, which is now at some medium pressure (e.g., 80-400 psia), is further depressurized to a lower pressure (e.g., 60-300 psia) in a direction the same as (shown in FIG. 15) or opposite (not shown in FIG. 15) as the feed flow.

4. Co-Current (CoC) Depressurization 3 (DP3). The carbon dioxide VPSA bed, which is now at some medium pressure (e.g., 60-300 psia), is further depressurized to a lower pressure (e.g., 50-200 psia) in a direction the same as (shown in FIG. 15) or opposite (not shown in FIG. 15) as the feed flow.

5. Final Depressurization (DPf). The carbon dioxide VPSA bed, which is now at a pressure lower than at the start of step 4 (about 50-200 psia) is further depressurized to a pressure close to ambient (about 20 psia) in a direction the same as (not shown in FIG. 15) and/or the opposite (shown in FIG. 15) the feed flow to produce carbon dioxide product 438 shown in FIG. 16. This stream may constitute part of the carbon dioxide product (stream 19).

6. Evacuation. The carbon dioxide VPSA bed, which is now close to ambient pressure (about 20 psia), is evacuated to a predetermined low pressure, a subambient pressure (about 1-12 psia) in a direction the same as (not shown in FIG. 15) or opposite (shown in FIG. 15) to the feed flow. The gas from the bed under evacuation (stream 436 in FIG. 16) constitutes part of the carbon dioxide product stream (stream 19). Optionally, stream 436 can be further compressed using a blower (not shown) prior to passing to tank 442.

7. Countercurrent (CcC) Pressure Equalization 3 (PE3). The evacuated bed is now pressure equalized to a pressure range of the gas produced in step 4 (DP3) (i.e., to about 50-200 psia) in a direction the same as (not shown in FIG. 15) or opposite (shown in FIG. 15) to the feed flow. This step increases carbon dioxide recovery by keeping the carbon dioxide from step 4 within the VPSA system. This minimizes carbon dioxide loss by eliminating the need to send the carbon dioxide to a waste stream.

8. Countercurrent (CcC) Pressure Equalization 2 (PE2). The bed pressure equalized in step 7 is now pressure equalized to a pressure range of the gas produced in step 3 (DP2) (i.e., to about 60-300 psia) in a direction the same as (not shown in FIG. 15) or opposite (shown in FIG. 15) to the feed flow. This step increases carbon dioxide recovery by keeping the carbon dioxide from step 3 within the VPSA system. This minimizes carbon dioxide loss by eliminating the need to send the carbon dioxide to a waste stream.

9. Countercurrent Pressure (CcC) Equalization 1 (PE1). The bed pressure equalized in step 8 is further pressure equalized to a pressure range of the gas produced in step 2 (DP1) (i.e., to about 80-400 psia) in a direction the same as (not shown in FIG. 15) or opposite (shown in FIG. 15) to the feed flow. This step further increases carbon dioxide recovery by keeping the carbon dioxide from step 2 within the VPSA system. This minimizes carbon dioxide loss by eliminating the need to send the carbon dioxide to a waste stream.

10. Repressurization (FeRP). The pressure-equalized bed is repressurized to a feed pressure (100-500 psia) either by the feed gas or by part of the effluent generated from another bed in step 1 (i.e. feed effluent). Following repressurization to feed pressure, this bed is now ready to go back to step 1.

As further shown in FIG. 15, carbon dioxide product 19 is formed of carbon dioxide from streams 438 (step 6) and 436 (step 7) fed to product tank 442. Product 19 is expected to have a carbon dioxide purity level of approximately 80 mole percent or greater.

The ten-step process described is for one cycle for one bed in the carbon dioxide VPSA unit. The above ten steps for this direct mixing embodiment are carried out in a cyclic manner with the other beds in the unit such that feed-into and feed-effluent from step 1 are continuous. In addition, the evacuation step (number 6) is designed to be continuous. This ensures that the vacuum pump operates continuously, and that there is no break in feed-into the carbon dioxide VPSA unit. Six adsorption beds are utilized in the embodiment described above to maintain the continuity of the key process steps.

Exemplary corresponding hardware and a flow schematic of the carbon dioxide VPSA process corresponding to the cycle shown FIG. 15 is depicted in FIG. 16. The various valves in FIG. 16 can be operated in the manner illustrated in FIG. 17 to carry out the ten steps in the six-bed process as described hereinabove. It should be appreciated that pressures and step durations shown are only for illustrative purposes. Those skilled in the art will appreciate that other combinations of pressures and steps may be used.

In the embodiment shown in FIGS. 15-17 and as described herein, the gas produced during the final depressurization step (DPf) is mixed with the evacuated gas from step number 6.

Another exemplary embodiment that utilizes direct mixing of the final depressurization gas stream (DPf) with the gas produced by evacuation bed is illustrated in FIG. 18.

Referring now to FIG. 18, a cycle step chart for an eight-step process that utilizes five beds and two pressure equalization steps is shown. These cycle steps are carried out in a similar manner to those steps described above with reference to FIG. 15, except that steps DP3 and PE3 have been eliminated. More specifically, the cycle steps for FIG. 18 include the following:

1. Feed Step. Feed stream 68 containing carbon dioxide at a high pressure between about 100-500 psia (for example, about 375 psia) is fed to carbon dioxide VPSA unit 70. After a predetermined time or after carbon dioxide breakthrough from the bed on the feed 68, the feed step is terminated.

2. Co-Current (CoC) Depressurization 1 (DP1). The carbon dioxide VPSA bed, which has finished the feed step is now at high feed pressure (e.g., 100-500 psia), is depressurized to a medium pressure (e.g., 80-400 psia) in a direction the same (shown in FIG. 18) or opposite (not shown in FIG. 18) as the feed flow.

3. Co-Current (CoC) Depressurization 2 (DP2). The carbon dioxide VPSA bed, which is now at some medium pressure (e.g., 80-400 psia), is further depressurized to a lower pressure (e.g., 60-300 psia) in a direction the same as (shown in FIG. 18) or opposite (not shown in FIG. 18) as the feed flow.

4. Final Depressurization (DPf). The carbon dioxide VPSA bed, which is now at a pressure lower than at the start of step 4 (about 50-200 psia) is further depressurized to a pressure close to ambient (about 20 psia) in a direction the same as (not shown in FIG. 18) and/or the opposite (shown in FIG. 18) the feed flow to produce carbon dioxide product 438. This stream may constitute part of the carbon dioxide product (stream 19).

5. Evacuation. The carbon dioxide VPSA bed, which is now close to ambient pressure (about 20 psia), is evacuated to a predetermined low pressure, a subambient pressure (about 1-12 psia) in a direction the same as (not shown in FIG. 18) or opposite (shown in FIG. 18) to the feed flow. The gas from the bed under evacuation (stream 36a in FIG. 16) constitutes part of the carbon dioxide product stream (stream 19). Optionally, stream 436 can be further compressed using a blower (not shown) prior to passing to tank 442.

6. Countercurrent (CcC) Pressure Equalization 2 (PE2). The evacuated bed is now pressure equalized to a pressure range of the gas produced in step 3 (DP2) (i.e., to about 60-300 psia) in a direction the same as (not shown in FIG. 18) or opposite (shown in FIG. 18) to the feed flow. This step increases carbon dioxide recovery by keeping the carbon dioxide from step 3 within the VPSA system. This minimizes carbon dioxide loss by eliminating the need to send the carbon dioxide to a waste stream.

7. Countercurrent Pressure (CcC) Equalization 1 (PE1). The bed pressure equalized in step 6 is further pressure equalized to a pressure range of the gas produced in step 2 (DP1) (i.e., to about 80-400 psia) in a direction the same as (not shown in FIG. 18) or opposite (shown in FIG. 18) to the feed flow. This step further increases carbon dioxide recovery by keeping the carbon dioxide from step 2 within the VPSA system. This minimizes carbon dioxide loss by eliminating the need to send the carbon dioxide to a waste stream.

8. Repressurization (FeRP). The pressure-equalized bed is repressurized to a feed pressure (100-500 psia) either by the feed gas or by part of the effluent generated from another bed in step 1 (i.e. feed effluent). Following repressurization to feed pressure, this bed is now ready to go back to step 1.

The carbon dioxide product stream 19 is formed of carbon dioxide from streams 438 (step 4) and 436 (step 5) in product tank 442.

The eight-step process described is for one cycle for one bed in the carbon dioxide VPSA unit. The above eight steps for this direct mixing embodiment are carried out in a cyclic manner with the other beds in the unit such that feed-into and feed-effluent from step 1 are continuous. In addition, the evacuation step (number 5) is designed to be continuous. This ensures that the vacuum pump operates continuously, and that there is no break in feed-into the carbon dioxide VPSA unit. Five adsorption beds are utilized in the embodiment described above to maintain the continuity of the key process steps.

It is also expected that the present invention can be modified to produce higher amounts of carbon dioxide and thus high plant capacity. For example, one may need or desire to process higher feed flow rates than may be handled by a single vacuum train or single vessel (due to fluidization or transportation limitations). In such situations, the process steps may be arranged such that at least two beds are on feed and at least two beds are under evacuation all the time. Such exemplary cycle step charts and arrangement are shown in FIGS. 19 and 20. Alternatively or in addition, multiple trains can be used. Absorption When stage 70 uses physical absorption with solvents such as selexol and rectisol, it can be placed just downstream of subambient-temperature processing stage 60. The carbon dioxide-depleted stream from such a physical absorption unit will be generally free of moisture. Physical absorption units process vent stream 68 from stage 60 and produce carbon dioxide-rich stream 19 and carbon dioxide-lean stream 72.

When stage 70 uses chemical absorption with reactant streams such as an aqueous solution of alkyl-substituted amine, ammonia or potassium carbonate, stream 68 is passed to the chemical absorption system 70 where it is treated by any known method in which the gaseous stream 68 is contacted with an aqueous solution of alkylamine, ammonia or potassium carbonate to absorb carbon dioxide from the gaseous stream into the aqueous stream, and the carbon dioxide is subsequently stripped from the resulting carbon dioxide-enriched aqueous stream.

FIG. 21 shows a flowsheet applicable to physical absorption and chemical absorption based carbon dioxide separation systems. The carbon dioxide-containing stream 68 is introduced into absorber 501 from the bottom. Stream 505 of solvent (as that term is used respectively with respect to physical absorption and chemical absorption processes) is fed to absorber 501 from the top. The solvent absorbs carbon dioxide from the feed stream. The resulting carbon dioxide-laden stream 510 is heated in heat exchanger 512 by recovering heat from carbon dioxide-lean solvent 520. The heated carbon dioxide-laden stream 513 is fed to the stripper 503. Optionally, the stripper is heated from the bottom by supplying heat via reboiler 530. A carbon dioxide-rich stream 19 is recovered from the top of stripper 503. The carbon dioxide-lean solvent 520 is cooled in heat exchanger 512 and then in cooler 523 and recycled to absorber 501 as stream 505.

What is claimed is:

1. A process for treating gaseous carbon dioxide, comprising
   (A) providing a gaseous feed stream of carbon dioxide that also comprises NOx and sulfur dioxide, and that is at a pressure of at least 1.5 bar;
   (B) adsorbing $SO_2$ and NOx from said feed stream onto a washed first bed of activated carbon under oxidizing conditions to convert adsorbed sulfur dioxide to sulfur trioxide and to convert adsorbed NO to nitrogen dioxide, thereby forming $SO_2$-depleted NOx-depleted carbon dioxide and a loaded first bed comprising SOx-loaded NOx-loaded activated carbon;
   (C) washing said loaded first bed with water to desorb sulfur trioxide and nitrogen dioxide therefrom into said water to form a mixture of sulfuric acid and nitric acid and a washed first bed of activated carbon, while adsorbing $SO_2$ and NOx from said feed stream onto a washed second bed of activated carbon under oxidizing conditions to convert adsorbed sulfur dioxide to sulfur trioxide and to convert adsorbed NO to nitrogen dioxide, thereby forming $SO_2$-depleted NOx-depleted carbon dioxide and a loaded second bed comprising SOx-loaded NOx-loaded activated carbon;
   (D) washing said loaded second bed with water to desorb sulfur trioxide and nitrogen dioxide therefrom into said water to form a mixture of sulfuric acid and nitric acid, while adsorbing SOx and NOx from said feed stream onto said washed first bed of activated carbon in step (B);
   (E) subjecting the $SO_2$-depleted NOx-depleted carbon dioxide to a subambient-temperature recovery process, employing refrigeration provided by expansion of at least one liquid carbon dioxide product stream formed by said recovery process to produce at least one gaseous carbon dioxide product stream and at least one gaseous carbon dioxide-containing vent stream;
   (F) separating the vent stream into a carbon dioxide-rich stream and a carbon dioxide-depleted stream, by pressure swing adsorption or by physical or chemical absorption; and
   (G) recycling said carbon dioxide-rich stream to said feed stream.

2. A process according to claim 1, further comprising reacting the mixtures of sulfuric acid and nitric acid formed in steps (C) and (D) with calcium carbonate to form calcium salts of said acids, and evolved carbon dioxide, and recycling evolved carbon dioxide to said feed stream.

3. A process according to claim 1 wherein said washed first and second beds are contacted with said carbon dioxide-depleted stream to remove water from said washed beds prior to adsorption of $SO_2$ and NOx thereon from said feed stream.

4. A process according to claim 1 wherein said feed stream is produced by oxy-fuel combustion with or without recycle of gaseous products of said combustion to the combustion.

5. A process according to claim 4 further comprising separating air into an oxygen-rich nitrogen-lean stream and a nitrogen-rich oxygen-lean stream, feeding said oxygen-rich nitrogen-lean stream to said oxy-fuel combustion, and contacting said washed first and second beds with said nitrogen-rich oxygen-lean stream to remove water from said washed beds prior to adsorption of $SO_2$ and NOx thereon from said feed stream.

6. A process according to claim 1 wherein the subambient-temperature recovery process in step (E) employs refrigeration provided only by expansion of at least one liquid carbon dioxide product stream formed in said subambient-temperature recovery process.

* * * * *